United States Patent
Li et al.

(10) Patent No.: US 12,425,367 B2
(45) Date of Patent: Sep. 23, 2025

(54) COMMUNICATION METHOD AND APPARATUS

(71) Applicant: HUAWEI TECHNOLOGIES CO., LTD., Guangdong (CN)

(72) Inventors: Yongcui Li, Beijing (CN); Zehao Chen, Shenzhen (CN); Hui Ni, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/618,200

(22) Filed: Mar. 27, 2024

(65) Prior Publication Data

US 2024/0244031 A1 Jul. 18, 2024

Related U.S. Application Data

(63) Continuation of application No. PCT/CN2022/121185, filed on Sep. 26, 2022.

(30) Foreign Application Priority Data

Sep. 30, 2021 (CN) .......................... 202111166464.6

(51) Int. Cl.
*H04L 61/4511* (2022.01)
*H04W 8/12* (2009.01)
(Continued)

(52) U.S. Cl.
CPC .......... *H04L 61/4511* (2022.05); *H04W 8/26* (2013.01); *H04L 2101/618* (2022.05); *H04W 84/042* (2013.01)

(58) Field of Classification Search
CPC .......... H04L 61/4511; H04L 2101/618; H04W 8/26; H04W 84/042; H04W 8/12; H04W 8/18; H04W 8/20
(Continued)

(56) References Cited

U.S. PATENT DOCUMENTS

2011/0223885 A1* 9/2011 Salkintzis ......... H04W 36/0016
                                                          455/411
2015/0139085 A1* 5/2015 Kaczmarska-Wojtania ..............
                                                          H04W 8/20
                                                          370/329
2020/0323029 A1 10/2020 Lu et al.

FOREIGN PATENT DOCUMENTS

WO         2020001440 A1     1/2020

OTHER PUBLICATIONS

3GPP TS 23.548 V2.0.0, 3rd Generation Partnership Project; Technical Specification Group Services and System Aspects; 5G System Enhancements for Edge Computing; Stage 2 (Release 17), Sep. 2021, total 52 pages.

(Continued)

*Primary Examiner* — Jude Jean Gilles
(74) *Attorney, Agent, or Firm* — Rimon PC

(57) ABSTRACT

This application provides a communication method and apparatus. The method may include receiving, by a second session management network element in a visited network, from a first session management network element in a home network, indication information, wherein the indication information indicates that traffic routing is allowed in the visited network. The method may further include sending, by the second session management network element and based on the indication information, IP address information of the visited network to a user plane network element in the visited network, wherein the IP address information is information used to determine an extension mechanisms for domain name system DNS client subnet option, or the IP address information is a local DNS server address.

20 Claims, 10 Drawing Sheets

(51) Int. Cl.
  *H04W 8/18* (2009.01)
  *H04W 8/20* (2009.01)
  *H04W 8/26* (2009.01)
  *H04L 101/618* (2022.01)
  *H04W 84/04* (2009.01)

(58) Field of Classification Search
  USPC .......................................................... 709/245
  See application file for complete search history.

(56) References Cited

OTHER PUBLICATIONS

3GPP TS 23.501 V17.2.0, 3rd Generation Partnership Project; Technical Specification Group Services and System Aspects; System architecture for the 5G System (5GS); Stage 2 (Release 17), Sep. 2021, total 542 pages.

3GPP TSG-SA2 Meeting #145 S2-2104498, New SID on Enhancement of support for Edge Computing in 5G Core network-phase 2, Huawei, HiSilicon, Electronic meeting, May 17-28, 2021, total 4 pages.

* cited by examiner

300

310 A first session management network element obtains IP address information of a visited network, where the first session management network element is a network element deployed in a home network 320 The first session management network element sends the IP address information to an edge application server discovery network element, where the edge application server discovery network element is a network element deployed in the home network

410 A second session management network element obtains information #B, where the information #B indicates that traffic routing is allowed in a visited network 420 The second session management network element sends IP address information of the visited network to a user plane network element based on the information #B

FIG. 4

COMMUNICATION METHOD AND APPARATUS

CROSS-REFERENCE TO RELATED APPLICATIONS

This application is a continuation of International Application No. PCT/CN2022/121185, filed on Sep. 26, 2022, which claims priority to Chinese Patent Application No. 202111166464.6, filed on Sep. 30, 2021. The disclosures of the aforementioned applications are hereby incorporated by reference in their entireties.

TECHNICAL FIELD

This application relates to the communication field, and more specifically, to a communication method and apparatus.

BACKGROUND

In an edge computing (EC) deployment scenario, some services may be provided by a plurality of edge application servers (EASs) deployed at a network edge. The plurality of EASs may provide the same services and the same content, and most of the EASs have different internet protocol (IP) addresses. In the EC scenario, when user equipment (UE) requests to access the service, the user equipment is required to access an available EAS that is close to the UE. Therefore, an appropriate IP address of the EAS is important.

In some cases, the UE may leave a coverage area of a home public land mobile network (HPLMN), and access a visited public land mobile network (VPLMN) through home routed (HR) roaming, and the VPLMN provides a service for the UE.

SUMMARY

This application provides a communication method and apparatus, to access a service in a VPLMN by using IP address information (for example, information used to determine an ECS option; in another example, an ECS option or a local domain name system (L-DNS) server) of the VPLMN, so that a local EAS in an HR roaming scenario is discovered.

According to a first aspect, a communication method is provided. The method may be performed by a core network element, or may be performed by a component (for example, a chip or a circuit) of the core network element. This is not limited. For ease of description, the following provides descriptions by using an example in which the method is performed by a first session management network element.

The method may include: The first session management network element obtains IP address information of a visited network. The first session management network element sends the IP address information to an edge application server discovery network element. The first session management network element and the edge application server discovery network element are network elements deployed in a home network.

Based on the foregoing technical solution, the first session management network element deployed in the home network may obtain the IP address information (for example, information used to determine an ECS option; in another example, an ECS option or an L-DNS server) of the visited network, and send the IP address information to the edge application server discovery network element. The IP address information of the visited network is obtained. In this way, after a terminal device accesses the visited network through HR roaming, because the edge application server discovery network element obtains the IP address information of the visited network, the terminal device may access a service in the visited network via the edge application server discovery network element. For example, after receiving a domain name system (DNS) query message from the terminal device, the edge application server discovery network element may add, to the DNS query message, the ECS option determined based on the IP address information, or may forward the DNS query message to the L-DNS server determined based on the IP address information (where for example, the IP address information is information about the L-DNS server address), so that a local EAS in an HR roaming scenario can be discovered.

With reference to the first aspect, in some implementations of the first aspect, the IP address information is information used to determine an extension mechanisms for domain name system DNS client subnet option (ECS option); or the IP address information is an ECS option or a local DNS server address.

With reference to the first aspect, in some implementations of the first aspect, that the first session management network element obtains IP address information of a visited network includes: The first session management network element obtains the IP address information of the visited network based on indication information. The indication information indicates that traffic routing is allowed in the visited network.

Based on the foregoing technical solution, when traffic routing is allowed in the visited network, the first session management network element obtains an IP address of the visited network, to avoid a case in which after the IP address information of the visited network is obtained, the IP address information of the visited network cannot be used because traffic routing is not allowed in the visited network.

With reference to the first aspect, in some implementations of the first aspect, that the first session management network element sends the IP address information to an edge application server discovery network element includes: The first session management network element sends the IP address information to the edge application server discovery network element based on the indication information. The indication information indicates that traffic routing is allowed in the visited network.

Based on the foregoing technical solution, when traffic routing is allowed in the visited network, the first session management network element sends the IP address information to the edge application server discovery network element.

With reference to the first aspect, in some implementations of the first aspect, the indication information includes an identifier of a first service, and the indication information indicates that the first service is allowed to be traffic-routed in the visited network.

For example, the identifier of the first service may be a fully qualified domain name (or a fully qualified domain name range), an application identifier, an IP address of an application server, or a port number.

With reference to the first aspect, in some implementations of the first aspect, that the first session management network element obtains IP address information of a visited network includes: The first session management network element receives the IP address information from a second session management network element. The second session management network element is a network element deployed in the visited network.

Based on the foregoing technical solution, the first session management network element may receive the IP address information from the second session management network element.

With reference to the first aspect, in some implementations of the first aspect, the method further includes: The first session management network element sends first request information to the second session management network element. The first request information is used to request the IP address information.

Based on the foregoing technical solution, the first session management network element may first send a request to the second session management network element, to request the IP address information, and further receive the IP address information from the second session management network element.

With reference to the first aspect, in some implementations of the first aspect, the method further includes: The first session management network element sends second request information to a network repository network element. The second request information includes an identifier of the visited network, the second request information is used to request the IP address information, and the network repository network element is a network element deployed in the home network. That the first session management network element obtains IP address information of a visited network includes: The first session management network element receives the IP address information of the visited network from the network repository network element.

Based on the foregoing technical solution, the first session management network element may send a request to the network repository network element, to request the IP address information, and further receive the IP address information from the network repository network element.

With reference to the first aspect, in some implementations of the first aspect, the method further includes: The first session management network element locally configures the indication information: or the first session management network element receives the indication information.

With reference to the first aspect, in some implementations of the first aspect, the indication information includes first indication information and/or second indication information, the first indication information is locally configured by the first session management network element, and the second indication information is received by the first session management network element.

With reference to the first aspect, in some implementations of the first aspect, that the first session management network element obtains IP address information of a visited network includes: The first session management network element determines the IP address information of the visited network based on a first correspondence and the identifier of the visited network. The first correspondence indicates a relationship between the visited network and the IP address information of the visited network.

Based on the foregoing technical solution, there may be a correspondence between the visited network and the IP address information of the visited network, or the visited network is associated with the IP address information of the visited network. In this way, the IP address information of the visited network may be determined based on the identifier of the visited network and the correspondence.

With reference to the first aspect, in some implementations of the first aspect, the method further includes: The first session management network element determines the indication information based on a second correspondence and the identifier of the visited network. The second correspondence indicates a relationship between the visited network and the indication information, and the indication information indicates whether traffic routing is allowed in the visited network.

Based on the foregoing technical solution, there may be a correspondence between the visited network and the indication information, or the visited network is associated with the indication information. In this way, the indication information corresponding to the visited network may be determined based on the identifier of the visited network and the correspondence. In this way, it may be further learned of whether traffic routing is allowed in the visited network.

According to a second aspect, a communication method is provided. The method may be performed by a core network element, or may be performed by a component (for example, a chip or a circuit) of the core network element. This is not limited. For ease of description, the following provides descriptions by using an example in which the method is performed by a second session management network element.

The method may include: The second session management network element obtains IP address information of a visited network. The second session management network element sends the IP address information to a first session management network element. The second session management network element is a network element deployed in the visited network, and the first session management network element is a network element deployed in a home network.

Based on the foregoing technical solution, the second session management network element deployed in the visited network may obtain the IP address information (for example, information used to determine an extension mechanisms for domain name system DNS client subnet option; in another example, an extension mechanisms for DNS client subnet option or a local DNS server address) of the visited network, and send the IP address information to the first session management network element deployed in the home network. In this way, after a terminal device accesses the visited network through HR roaming, the terminal device may access a service in the visited network by using the IP address information.

With reference to the second aspect, in some implementations of the second aspect, that the second session management network element obtains IP address information of a visited network includes: The second session management network element obtains the IP address information of the visited network based on indication information. The indication information indicates that traffic routing is allowed in the visited network.

Based on the foregoing technical solution, when traffic routing is allowed in the visited network, the second session management network element obtains an IP address of the visited network, to avoid a case in which after the IP address information of the visited network is obtained, the IP address information of the visited network cannot be used because traffic routing is not allowed in the visited network.

With reference to the second aspect, in some implementations of the second aspect, that the second session management network element sends the IP address information to a first session management network element includes: The second session management network element sends the IP address information to the first session management network element based on the indication information. The indication information indicates that traffic routing is allowed in the visited network.

Based on the foregoing technical solution, when traffic routing is allowed in the visited network, the second session management network element sends the IP address information to the first session management network element.

With reference to the second aspect, in some implementations of the second aspect, the indication information includes an identifier of a first service, and the indication information indicates that the first service is allowed to be traffic-routed in the visited network.

For example, the identifier of the first service may be a fully qualified domain name (or a fully qualified domain name range), an application identifier, an IP address of an application server, or a port number.

With reference to the second aspect, in some implementations of the second aspect, the method further includes: The second session management network element receives first request information from the first session management network element. The first request information is used to request the IP address information. That the second session management network element sends the IP address information to a first session management network element includes: The second session management network element sends the IP address information to the first session management network element in response to the first request information.

Based on the foregoing technical solution, the second session management network element may receive a request sent by the first session management network element. The request is used to request the IP address information. The second session management network element sends the IP address information to the first session management network element in response to the request.

With reference to the second aspect, in some implementations of the second aspect, the method further includes: The second session management network element locally configures the indication information; or the second session management network element receives the indication information.

With reference to the second aspect, in some implementations of the second aspect. the IP address information is information used to determine an extension mechanisms for domain name system DNS client subnet option; or the IP address information is an extension mechanisms for domain name system client subnet option or a local DNS server address.

According to a third aspect, a communication method is provided. The method may be performed by a core network element, or may be performed by a component (for example, a chip or a circuit) of the core network element. This is not limited. For ease of description, the following provides descriptions by using an example in which the method is performed by a second session management network element.

The method may include: The second session management network element obtains indication information. The indication information indicates that traffic routing is allowed in a visited network. The second session management network element sends IP address information of the visited network to a user plane network element based on the indication information. The second session management network element and the user plane network element are network elements deployed in the visited network.

For example, the user plane network element may be a user plane function (UPF) or an edge application server discovery network element, or may be a module in which the UPF and the edge application server discovery network element are jointly deployed.

Based on the foregoing technical solution, the second session management network element deployed in the visited network may send the IP address information (for example, information used to determine an ECS option; in another example, an ECS option or an L-DNS server address) of the visited network to the user plane network element based on the indication information. In this way, after a terminal device accesses the visited network through HR roaming, the terminal device may access a service in the visited network by using the IP address information. For example, the user plane network element may add, to a DNS query message, the ECS option determined based on the IP address information, or the user plane network element sends the ECS option or the IP address information to the edge application server discovery network element. The edge application server discovery network element may add, to the DNS query message, the ECS option determined based on the IP address information, or may forward the DNS query message to an L-DNS server determined based on the IP address information. In this way, a local EAS in an HR roaming scenario can be discovered.

With reference to the third aspect, in some implementations of the third aspect, that the second session management network element obtains indication information includes: The second session management network element locally configures the indication information; or the second session management network element receives the indication information.

With reference to the third aspect, in some implementations of the third aspect, the indication information includes an identifier of a second service, and the indication information indicates that the second service is allowed to be traffic-routed in the visited network.

For example, the identifier of the second service may be a fully qualified domain name (or a fully qualified domain name range), an application identifier, an IP address of an application server, or a port number.

With reference to the third aspect, in some implementations of the third aspect, the indication information includes first indication information and/or second indication information, the first indication information is locally configured by the second session management network element, and the second indication information is received by the second session management network element.

With reference to the third aspect, in some implementations of the third aspect, the IP address information is information used to determine an extension mechanisms for domain name system DNS client subnet option; or the IP address information is an extension mechanisms for DNS client subnet option or a local DNS server address.

According to a fourth aspect, a communication method is provided. The method may be performed by a core network element, or may be performed by a component (for example, a chip or a circuit) of the core network element. This is not limited. For ease of description, the following provides descriptions by using an example in which the method is performed by a policy control network element.

The method may include: The policy control network element obtains indication information. The indication information indicates whether traffic routing is allowed in a visited network. The policy control network element sends the indication information to a first session management network element. The first session management network element is a network element deployed in a home network.

With reference to the fourth aspect, in some implementations of the fourth aspect, the method further includes: The policy control network element sends an identifier of a first service to the first session management network element. The first service is a service that is allowed to be traffic-routed in the visited network.

With reference to the fourth aspect, in some implementations of the fourth aspect, the indication information includes an identifier of a first service, and the indication information indicates that the first service is allowed to be traffic-routed in the visited network.

According to a fifth aspect, a communication method is provided. The method may be performed by a core network element, or may be performed by a component (for example, a chip or a circuit) of the core network element. This is not limited.

The method may include: A first session management network element obtains IP address information of a visited network. The first session management network element sends the IP address information to an edge application server discovery network element. The first session management network element and the edge application server discovery network element are network elements deployed in a home network. The edge application server discovery network element receives the IP address information.

With reference to the fifth aspect, in some implementations of the fifth aspect, the edge application server discovery network element receives a DNS query message. The edge application server discovery network element adds an extension mechanisms for domain name system client subnet option to the DNS query message. The extension mechanisms for domain name system client subnet option is determined based on the IP address information.

With reference to the fifth aspect, in some implementations of the fifth aspect, the edge application server discovery network element receives a DNS query message. The edge application server discovery network element forwards the DNS query message to a local DNS server address. The local DNS server address is determined based on the IP address information.

With reference to the fifth aspect, in some implementations of the fifth aspect, the IP address information is information used to determine the extension mechanisms for domain name system DNS client subnet option; or the IP address information is the extension mechanisms for domain name system client subnet option or the local DNS server address.

According to a sixth aspect, a communication method is provided. The method may be performed by a core network element, or may be performed by a component (for example, a chip or a circuit) of the core network element. This is not limited.

The method may include: A second session management network element obtains indication information. The indication information indicates that traffic routing is allowed in a visited network. The second session management network element sends IP address information of the visited network to a user plane network element based on the indication information. The second session management network element and the user plane network element are network elements deployed in the visited network. The user plane network element receives the IP address information.

With reference to the sixth aspect, in some implementations of the sixth aspect, the user plane network element receives a DNS query message. The user plane network element adds an extension mechanisms for domain name system client subnet option to the DNS query message. The extension mechanisms for domain name system client subnet option is determined based on the IP address information.

With reference to the sixth aspect, in some implementations of the sixth aspect, the user plane network element receives a DNS query message. The user plane network element forwards the DNS query message to a local DNS server address. The local DNS server address is determined based on the IP address information.

With reference to the sixth aspect, in some implementations of the sixth aspect, the user plane network element sends the IP address information to an edge application server discovery network element. The edge application server discovery network element is a network element deployed in a home network.

With reference to the sixth aspect, in some implementations of the sixth aspect, the IP address information is information used to determine the extension mechanisms for domain name system DNS client subnet option; or the IP address information is the extension mechanisms for domain name system client subnet option or the local DNS server address.

According to a seventh aspect, a communication apparatus is provided. The apparatus is configured to perform the method in any one of the possible implementations of the first aspect to the sixth aspect. Specifically, the apparatus may include units and/or modules configured to perform the method in any one of the possible implementations of the first aspect to the sixth aspect, for example, a processing unit and/or a communication unit.

In an implementation, the apparatus is a core network element. When the apparatus is the core network element, the communication unit may be a transceiver or an input/output interface, and the processing unit may be at least one processor. Optionally, the transceiver may be a transceiver circuit. Optionally, the input/output interface may be an input/output circuit.

In another implementation, the apparatus is a chip, a chip system, or a circuit used in a core network element. When the apparatus is the chip, the chip system, or the circuit used in the core network element, the communication unit may be an input/output interface, an interface circuit, an output circuit, an input circuit, a pin, a related circuit, or the like on the chip, the chip system, or the circuit. The processing unit may be at least one processor, processing circuit, logic circuit, or the like.

According to an eighth aspect, a communication apparatus is provided. The apparatus includes at least one processor, configured to execute a computer program or instructions stored in a memory, to perform the method in any one of the possible implementations of the first aspect to the sixth aspect. Optionally, the apparatus further includes the memory, configured to store the computer program or the instructions. Optionally, the apparatus further includes a communication interface, and the processor reads, through the communication interface, the computer program or the instructions stored in the memory.

In an implementation, the apparatus is a core network element.

In another implementation, the apparatus is a chip, a chip system, or a circuit used in a core network element.

According to a ninth aspect, this application provides a processor, configured to perform the methods provided in the foregoing aspects.

Unless otherwise specified, or if operations such as sending and obtaining/receiving related to the processor do not conflict with an actual function or internal logic of the processor in related descriptions, the operations may be understood as operations such as outputting, receiving, and inputting of the processor, or may be understood as sending and receiving operations performed by a radio frequency circuit and an antenna. This is not limited in this application.

According to a tenth aspect, a computer-readable storage medium is provided. The computer-readable storage medium stores program code to be executed by a device, and the program code is used to perform the method in any one of the possible implementations of the first aspect to the sixth aspect.

According to an eleventh aspect, a computer program product including instructions is provided. When the computer program product runs on a computer, the computer is enabled to perform the method in any one of the possible implementations of the first aspect to the sixth aspect.

According to a twelfth aspect, a communication system is provided, and includes one or more of the foregoing first session management network element, second session management network element, edge application server discovery network element, and user plane network element.

BRIEF DESCRIPTION OF DRAWINGS

FIG. 3 is a schematic diagram of a communication method 300 according to an embodiment of this application;

FIG. 4 is a schematic diagram of another communication method 400 according to an embodiment of this application;

DESCRIPTION OF EMBODIMENTS

The following describes technical solutions of this application with reference to the accompanying drawings.

The technical solutions provided in this application may be applied to various communication systems, for example, a 5th generation (5G) system or a new radio (NR) system, a long term evolution (LTE) system, an LTE frequency division duplex (FDD) system, and an LTE time division duplex (TDD) system. The technical solutions provided in this application may be further applied to a future communication system, for example, a 6th generation mobile communication system. The technical solutions provided in this application may be further applied to device-to-device (D2D) communication, vehicle-to-everything (V2X) communication, machine-to-machine (M2M) communication, machine type communication (MTC), an internet of things (IoT) communication system, or another communication system.

First, a network architecture applicable to this application is briefly described with reference to FIG. 1 and FIG. 2 below.

Figure 1:
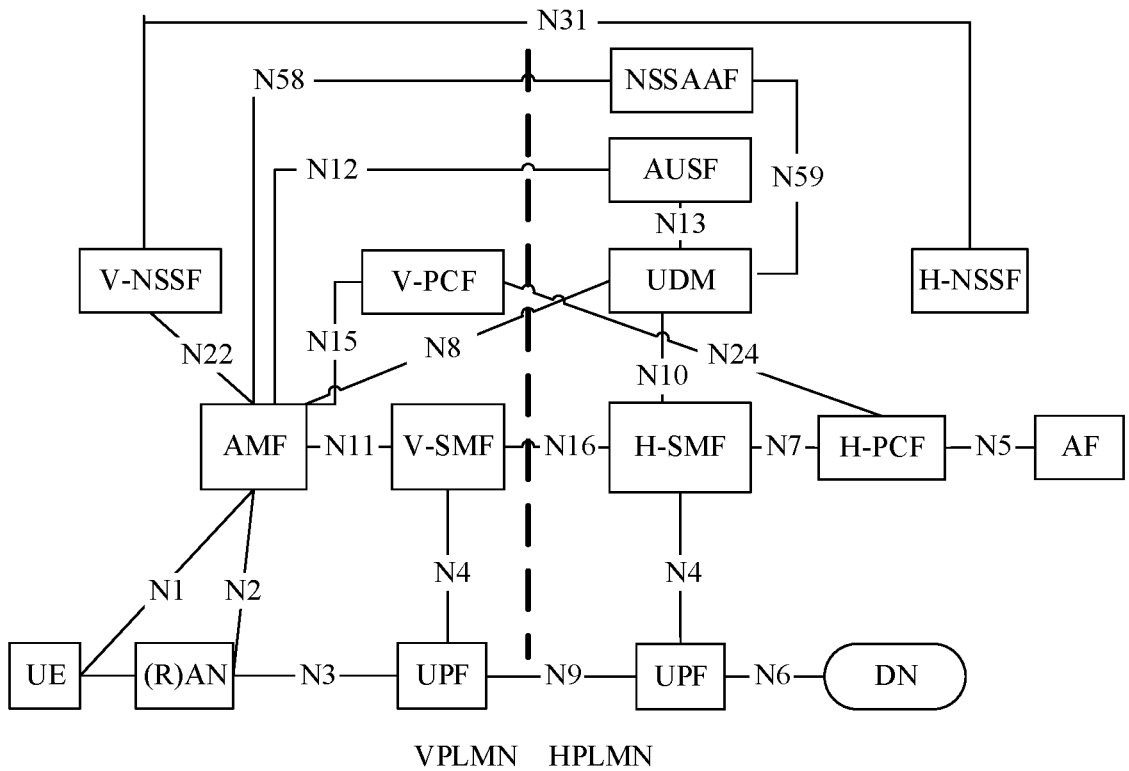
FIG. 1 is a schematic diagram of a network architecture.

FIG. 1 is an example schematic diagram of a network architecture.

As shown in FIG. 1, the network architecture uses HR roaming as an example.

A cellular mobile communication network of an operator may be referred to as a public land mobile network (PLMN). A PLMN subscribed to by a UE may be referred to as a HPLMN, and represents a home network of a subscriber. When the UE leaves a coverage area of the HPLMN due to movement or another reason, the UE may access a PLMN if the PLMN meets the following conditions: (1) The PLMN can cover a current location of the UE; (2) An operator of the PLMN and an operator of the HPLMN of the UE sign a roaming protocol (where the roaming protocol indicates a protocol between the operators, content of which may include, for example, but is not limited to, a service and a charging manner provided for a subscriber of a network of a peer operator, however this is not limited). In addition, the PLMN may be referred to as a VPLMN. Behavior of the UE accessing the VPLMN may be referred to as roaming. Roaming scenarios may include local breakout (LBO) roaming and HR roaming. A main difference between the local breakout roaming and the home routed roaming is whether a session needs to be connected to a UPF of the home network. In the HR roaming scenario, the session (for example, referred to as an HR session) is connected to the UPF of the home network. The HR session refers to a session that is established when a user is located in the visited network and that is connected to the UPF of the home network. Service traffic carried in the HR session is sent from the UE to the UPF of the home network, and then, is sent to a receive end.

As shown in FIG. 1, the network architecture may include, but is not limited to: a network slice-specific authentication and authorization function (NSSAAF), a network slice selection function (NSSF), an authentication server function (AUSF), unified data management (UDM), a policy control function (PCF), an application function (AF), an access and mobility management function (AMF), a session management function (SMF), UE, a radio access network device, a UPF, a data network (DN), and the like.

The following briefly describes the network elements shown in FIG. 1.

1. UE: The UE may be referred to as a terminal device, an access terminal, a subscriber unit, a subscriber station, a mobile station, a remote station, a remote terminal, a mobile device, a user terminal, a terminal, a wireless communication device, a user agent, or a user apparatus.

The terminal device may be a device that provides voice/data for a user, for example, a handheld device or a vehicle-mounted device with a wireless connection function. Currently, some examples of the terminal are: a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote surgery; a wireless terminal in smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), the handheld device with the wireless communication function, a computing device or another processing device connected to a wireless modem, a wearable device, a terminal device in a 5G network, a terminal device in a future evolved PLMN, and the like. This is not limited in embodiments of this application.

By way of example, and not limitation, in embodiments of this application, the terminal device may alternatively be the wearable device. The wearable device may also be referred to as a wearable intelligent device, and is a generic term for wearable devices such as glasses, gloves, watches, clothes, and shoes that are developed by applying wearable technologies to intelligent designs of daily wear. The wearable device is a portable device that can be directly worn on the body or integrated into clothes or an accessory of the user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that are dedicated to only one type of application function and need to collaboratively work with other devices such as smartphones, for example, various smart bands or smart jewelry for monitoring physical signs.

In addition, the terminal device in embodiments of this application may alternatively be a terminal device in an IoT system. An IoT is an important part of future development of information technologies. A main technical feature of IoT is connecting a thing to a network by using a communication technology, to implement an intelligent network for interconnection between a person and a machine or between one thing and another.

It should be noted that the terminal device and an access network device may communicate with each other by using an air interface technology (for example, an NR technology or an LTE technology). Alternatively, terminal devices may communicate with each other by using the air interface technology.

In embodiments of this application, an apparatus configured to implement a function of the terminal device may be a terminal device, or may be an apparatus that can support the terminal device in implementing the function, for example, a chip system or a chip. The apparatus may be installed in the terminal device. In embodiments of this application, the chip system may be formed by a chip, or may include the chip and another discrete component.

2. Radio access network (RAN) device: The RAN may provide a function of accessing a communication network for an authorized user in an area, and may include a wireless network device in a 3rd Generation Partnership Project (3GPP) network, or may include an access point in a non-3GPP network. For ease of description, the following uses an access network (AN) device for representation.

The AN device may use different radio access technologies. Currently, there are two types of radio access technologies: 3GPP access technology (for example, a radio access technology applied to a 3rd generation (3G) system, a 4th generation (4G) system, or a 5G system) and non-3GPP access technology. The 3GPP access technology is an access technology that complies with a 3GPP standard specification. An access network device in the 5G system may be referred to as a next generation node base station (gNB) or a RAN device. The non-3GPP access technology may include an air interface technology represented by an access point (AP) in wireless fidelity (Wi-Fi), worldwide interoperability for microwave access (WiMAX), code division multiple access ( ) and the like. The AN device may allow interconnection and interworking between the terminal device and a 3GPP core network by using the non-3GPP technology.

The AN device may be responsible for functions such as radio resource management, quality of service (QOS) management, and data compression and encryption on an air interface side. The AN device provides an access service for the terminal device, to forward a control signal and user data between the terminal device and the core network.

For example, the AN device may include, but is not limited to: a macro base station, a micro base station (also referred to as a small cell), a radio network controller (RNC), a NodeB, a base station controller (BSC), a base transceiver station (BTS), a home base station (for example, a home evolved NodeB, or a home NodeB), a baseband unit ( ) an AP in a Wi-Fi system, a wireless relay node, a wireless backhaul node, a transmission point (TP), or a transmission reception point (TRP), or may be a gNB or a TRP/TP in the 5G (for example, NR) system, one or a group of antenna panels of a base station in the 5G system, or may be a network node that forms a gNB or the transmission point, for example, a distributed unit (DU), or a base station in a next generation communication 6G system. A specific technology or a specific device form used by the AN device are not limited in embodiments of this application.

3. AMF: The AMF is mainly used for functions such as access control, mobility management, and attachment and detachment.

4. SMF: The SMF is mainly used for user plane network element selection, user plane network element redirection. IP address allocation of the terminal device, and session management in a mobile network, for example, establishment, modification, and release of a session, and QoS control.

In this application, for differentiation, an SMF in the HPLMN is denoted as a home SMF (H-SMF), and an SMF in the VPLMN is denoted as a visited SMF (V-SMF).

5. UPF: The UPF is mainly configured to receive and forward user plane data. For example, the UPF may receive user plane data from the DN, and send the user plane data to the terminal device via the AN device. The UPF may alternatively receive user plane data from the terminal device via the AN device, and forward the user plane data to the DN. A UPF that is directly connected to the DN through an N6 interface in a session may be referred to as a protocol data unit (PDU) session anchor (PSA).

In this application, for differentiation, a UPF in the HPLMN is denoted as a home UPF (H-UPF), and a UPF in the VPLMN is denoted as a visited UPF (V-UPF). In addition, for differentiation, a PSA in the HPLMN is denoted as a home PSA (H-PSA), and a PSA in the VPLMN is denoted as a visited PSA (V-PSA) (or denoted as a local PSA (L-PSA)).

6. PCF: The PCF is mainly configured to support a unified policy framework to govern network behavior, provide policy rule information for a control plane function network element (for example, the AMF network element or the SMF network element), and the like.

7. AF: The AF is mainly configured to provide a service for a 3GPP network, for example, interact with the PCF to perform policy control.

8. NSSF: The Network slice selection function is mainly used for network slice selection.

9. UDM: The UDM is mainly used for subscription data management of the UE. including storage and management of a UE identifier, access authorization of the UE, and the like.

10. DN: The DN is mainly used for an operator network that provides a data service for the UE, for example, the internet, a third-party service network, and an IP multimedia service (IMS) network.

11. AUSF: The AUSF is mainly used for user authentication.

Figure 2:
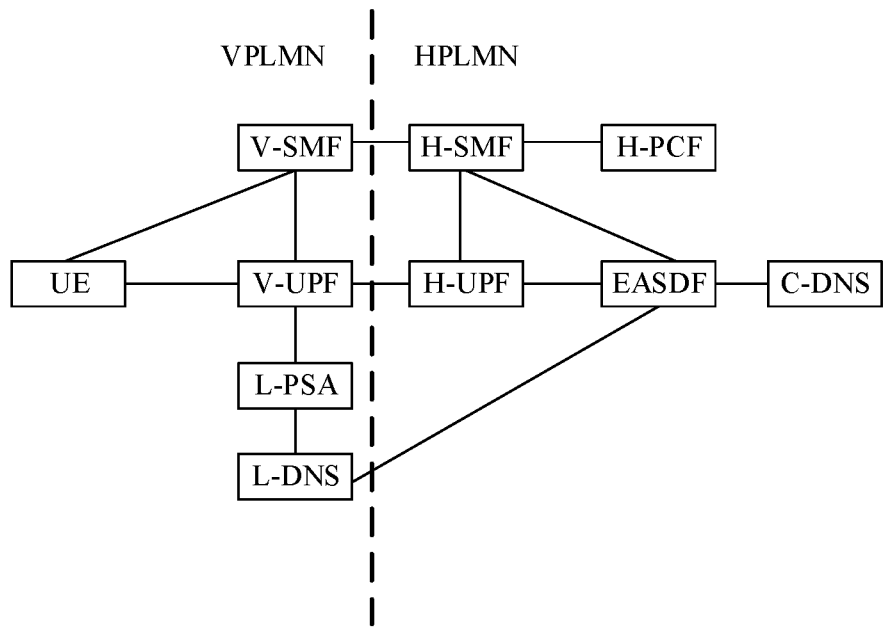
FIG. 2 is a schematic diagram of another network architecture.

For example, FIG. 2 is a schematic diagram of another network architecture.

As shown in FIG. 2, the network architecture may be understood as an enhancement of the HR roaming architecture shown in FIG. 1. The network architecture may include, but is not limited to: an SMF (such as a V-SMF and an H-SMF), UE, a UPF (such as a V-UPF and an H-UPF), a PSA (such as an L-PSA), a domain name system (DNS), a PCF (such as an H-PCF), and an edge application server discovery network element (EASDF). In the architecture, a DNS message may be terminated at an EASDF of an HPLMN. That the DNS message may be terminated at the EASDF of the HPLMN may indicate that the EASDF of the HPLMN processes the DNS message, or may indicate that a destination address of the DNS message is the EASDF of the HPLMN, or may indicate that the EASDF of the HPLMN receives the DNS message. The edge application server may also be referred to as an edge application (service) discovery function, an application instance discovery function, an edge application instance discovery function, an MEC application (server) discovery function, or the like, however, it is not limited to this.

The EASDF is mainly configured to assist edge application server (EAS) discovery. Main functions of the EASDF include processing the DNS message based on an indication of the SMF. Processing the DNS message may include but is not limited to: reporting the DNS message to the SMF, adding an extension mechanisms for DNS (EDNS) client subnet option (ECS option) to a DNS query, forwarding the DNS query to a DNS server, forwarding a DNS response to the UE, and the like. In this application, for differentiation, a DNS in the HPLMN is denoted as a C-DNS, and a DNS in a VPLMN is denoted as an L-DNS.

For descriptions of other network elements, refer to the descriptions in FIG. 1. Details are not described herein again.

In the network architecture shown in FIG. 1 or FIG. 2, network elements may communicate with each other through an interface. For example, the UE is connected to the AN device according to a radio resource control (RRC) protocol, and the UE communicates with the AN device through a Uu interface. Alternatively, refer to interfaces shown in FIG. 1. Details are not described herein again.

It should be understood that the network architecture shown above is merely an example for description, and a network architecture applicable to embodiments of this application is not limited thereto. Any network architecture that can implement functions of the foregoing network elements is applicable to embodiments of this application. In addition, the network architecture shown above may further include other network elements, for example, a network repository function (NRF) network element. This is not limited. In this application, for differentiation, an NRF in the HPLMN is denoted as a home NRF (H-NRF), and an NRF in the VPLMN is denoted as a visited NRF (V-NRF).

The functions or the network elements such as the AMF, SMF, UPF, PCF, UDM, NSSF and AUSF shown in FIG. 1 or FIG. 2 may be understood as network elements configured to implement different functions and may be combined into a network slice as required. These network elements may be independent devices, may be integrated into a same device to implement different functions, may be network elements in a hardware device, may be software functions running on dedicated hardware, or may be virtualization functions instantiated on a platform (for example, a cloud platform). Specific forms of the network elements are not limited in this application.

It should be further understood that the foregoing names are defined merely for distinguishing between different functions, and should not constitute any limitation on this application. This application does not exclude a possibility of using other names in a 6G network and another future network. For example, in the 6G network, a part or all of the foregoing network elements may still use terms in 5G, may use other names.

In an EC deployment scenario, some services may be provided by a plurality of EASs deployed at a network edge. The EASs may provide the same services and the same content, and most of the EASs have different IP addresses. In the EC scenario, when UE accesses the service, the UE may be requested to access an available EAS that is close to the UE. Therefore, it is important to obtain an appropriate IP address of the EAS.

As described above, the UE may access a VPLMN through HR roaming, and the VPLMN provides a service for the UE. If access through HR roaming is required, for these services, a session anchor is in an HPLMN. An application server (AS) IP returned by a remote DNS server is close to an H-UPF, but may be far away from the UE. As a result, a path for the UE to access an AS is long, and user experience is poor. Therefore, an existing edge service discovery mechanism cannot be applied to the HR roaming scenario.

This application provides a solution, to access a service in a VPLMN by using IP address information (for example, information used to determine an ECS option; in another example, an ECS option or an L-DNS server) of the VPLMN, so that a local EAS in an HR roaming scenario is discovered.

For example, a session management network element in an HPLMN obtains the IP address information (for example, the information used to determine the ECS option; in another example, the ECS option or the L-DNS server) of the visited network, and sends the IP address information to an edge application server discovery network element in the HPLMN. In this way, that a terminal device accesses the service in the VPLMN may be implemented by the edge application server discovery network element based on the obtained IP address information. For example, after receiving a DNS query message from the terminal device, the edge application server discovery network element in the HPLMN may add, to the DNS query, the ECS option determined based on the IP address information, or forward the DNS query message to the L-DNS server determined based on the IP address information (where for example, the IP address information is information about the L-DNS server), so that the local EAS in the HR roaming scenario can be discovered.

For another example, a session management network element in the VPLMN obtains information #B, where the information #B indicates that traffic routing is allowed in the visited network. The session management network element in the VPLMN may send the IP address information (for example, information used to determine an ECS option; in another example, an ECS option or an L-DNS server address) of the visited network to a user plane network element in the VPLMN based on the information #B. In this way, after a terminal device accesses the visited network through HR roaming, the terminal device may access the service in the visited network by using the IP address information. For example, the user plane network element in the VPLMN may add the ECS option to a DNS query message, or the user plane network element in the VPLMN sends, to an edge application server discovery network element, the ECS option or the information used to determine the ECS option, and the edge application server discovery network element may add the ECS option to the DNS query message, so that the local EAS in the HR roaming scenario can be discovered.

It may be understood that the term "and/or" in this specification describes only an association relationship between associated objects and represents that three relationships may exist. For example. A and/or B may represent the following three cases: Only A exists, both A and B exist, and only B exists. In addition, the character "/" in this specification usually represents an "or" relationship between the associated objects.

The following describes in detail communication methods provided in embodiments of this application with reference to the accompanying drawings. Embodiments of this application may be applied to the network architecture shown in FIG. 1 or FIG. 2, however, this is not limited thereto.

FIG. 3 is a schematic diagram of a communication method 300 according to an embodiment of this application. The method 300 may include the following steps.

310: A first session management network element obtains IP address information of a visited network, where the first session management network element is a network element deployed in a home network.

The visited network is a network accessed by a terminal device after the terminal device leaves the home network. The visited network is, for example, a VPLMN. The following mainly uses the VPLMN as an example for description.

The home network is a network to which the terminal device subscribes. The home network is, for example, an HPLMN. The following mainly uses the HPLMN as an example for description.

The first session management network element is a network element deployed in the HPLMN. For example, the first session management network element is an H-SMF.

In an example, the IP address information (denoted as information #A for differentiation) refers to information used to determine an ECS option; the IP address information is an ECS option; or the IP address information is an IP address or a prefix of a subnet. For example, in step 310, the H-SMF obtains the information #A, where the information #A is used to determine the ECS option (namely; an ECS option of the VPLMN). For example, when the information #A is the information used to determine the ECS option, the information #A may alternatively be the ECS option. Unless otherwise specified, the ECS option mentioned below refers to the ECS option of the VPLMN.

In another example, information #A refers to a local DNS (local DNS, L-DNS) server address. For example, in step 310, the H-SMF obtains the information #A, where the information #A is the L-DNS server address.

It may be understood that the IP address information may be further described as a media access control (MAC) address of the subnet. A representation form of the IP address information is not limited in this application.

In the following, for ease of description, the ECS option is used as an example for description, and this application is not limited thereto. For example, the ECS option may alternatively be replaced with the L-DNS server address. Correspondingly, an action of adding the ECS option to a DNS query may alternatively be replaced with an action of forwarding the DNS query to an L-DNS server.

For the information #A, details are not described below again.

320: The first session management network element sends the IP address information to an edge application server discovery network element, where the edge application server discovery network element is a network element deployed in the home network.

The edge application server discovery network element is a network element deployed in the HPLMN. For example, the edge application server discovery network element is an H-EASDF.

Based on the foregoing technical solution, the first session management network element deployed in the home network may obtain the IP address information (for example, the information used to determine the ECS option; in another example, the ECS option or the L-DNS server) of the visited network, and send the IP address information to the edge application server discovery network element. In this way, after the terminal device accesses the visited network through HR roaming, the terminal device may access a service in the visited network via the edge application server discovery network element, because the edge application server discovery network element obtains the IP address information of the visited network. For example, after receiving a DNS query message from the terminal device, the edge application server discovery network element may add, to the DNS query message, the ECS option determined based on the IP address information, or may forward the DNS query message to the L-DNS server determined based on the IP address information (where, for example, the IP address information is information about the L-DNS server address), so that a local EAS in an HR roaming scenario can be discovered.

Optionally, in step 310, that a first session management network element obtains IP address information of a visited network includes: The first session management network element obtains the IP address information of the visited network based on indication information (denoted as information #B for differentiation), where the information #B indicates that traffic routing is allowed in the visited network.

For example, if the H-SMF learns that traffic routing is allowed in the VPLMN, the H-SMF obtains the IP address information (namely, the information #A) of the VPLMN.

Optionally, in step 320, that the first session management network element sends the information #A to an edge application server discovery network element includes: The first session management network element sends the information #A to the edge application server discovery network element based on the information #B, where the information #B indicates that traffic routing is allowed in the visited network (or the information #B indicates that traffic routing is allowed).

For example, if the information #B indicates that traffic routing is allowed in the VPLMN, and the H-SMF learns that traffic routing is allowed in the VPLMN, the H-SMF sends the information #A to the H-EASDF.

The following describes the information #B in detail.

The information #B indicates that traffic routing is allowed in the visited network, and the information #B may be further described as indicating (representing or indicating) that traffic routing is allowed (authorized or expected). "Allow" may represent authorization, or may represent expectation.

In an example, that traffic routing is allowed represents that traffic routing is allowed in the VPLMN. Correspondingly, that the information #B indicates that traffic routing is allowed in the visited network may alternatively be replaced with the following: The information #B indicates that traffic routing is allowed in the VPLMN.

In another example, that traffic routing is allowed represents whether the HPLMN allows local traffic routing in the VPLMN. Correspondingly, that the information #B indicates that traffic routing is allowed in the visited network may alternatively be replaced with the following: The information #B indicates whether the HPLMN allows local traffic routing in the VPLMN.

In another example, that traffic routing is allowed represents that the ECS option is allowed to be added (used or obtained) (the L-DNS server address is allowed to be obtained or the DNS query is allowed to be forwarded to the L-DNS server). Correspondingly, that the information #B indicates that traffic routing is allowed in the visited network may alternatively be replaced with the following: The information #B indicates that the ECS option is allowed to be added (used or obtained) (the L-DNS server address is allowed to be obtained or the DNS query is allowed to be forwarded to the L-DNS server).

In another example, that traffic routing is allowed represents that the ECS option is added (used or obtained) (the L-DNS server address is obtained or the DNS query is forwarded to the L-DNS server). Correspondingly, that the information #B indicates that traffic routing is allowed in the visited network may alternatively be replaced with the following: The information #B indicates that the ECS option is added (used or obtained) (the L-DNS server address is obtained or the DNS query is forwarded to the L-DNS server).

Specific content of the "information #B" is not limited in this application. For unified description, the following mainly provides descriptions by using an example in which the "information #B" indicates whether traffic routing is allowed in the VPLMN.

It may be understood that this application is mainly described by using an example in which traffic routing is allowed in the VPLMN, and does not limit a situation in which local traffic routing in the VPLMN needs to be allowed in all cases. In other words, in some cases, traffic routing may not be allowed (or not be supported) in the VPLMN. In these cases, local traffic routing may not be performed in the VPLMN.

A specific name of the information #B is not limited in this application. For example, in this application, the "information #B" may be replaced with an "authorization policy", a "traffic routing policy", or a "roaming policy".

A form of the information #B is not limited in this application. For example, the information #B may be in a form of an information element, a parameter, or a table.

Optionally, the information #B indicates that a first service is allowed to be traffic-routed in the visited network. Optionally, the information #B includes an identifier of the first service. For example, the first session management network element may further send the identifier of the first service to the edge application server discovery network element. The identifier of the first service and the information #B may be carried in same signaling, or may be separately sent. This is not limited in this application.

For example, that the first service is allowed to be traffic-routed in the visited network may represent that the ECS option is allowed to be added to (or used in) a DNS query corresponding to the first service, may represent that a packet corresponding to the first service is allowed to be forwarded to the L-DNS server, or may represent that the ECS option is allowed to be added to an uplink packet, where a manner of adding the ECS option to the uplink packet is not limited in this application. For example, the ECS option may be added to a general packet radio service (GPRS) tunnelling protocol for the user plane (GTP-U) packet header.

In an example, the identifier of the first service may be any one of the following: a fully qualified domain name (FQDN) (or an FQDN range), an application identifier (AppID), an IP address, and a port number. In other words, the information #B may include one or more of the following: the FQDN (or the FQDN range), the application identifier, and the IP address. The following mainly uses the FQDN as an example for description. It may be understood that the FQDN in the following examples may alternatively be replaced with any one of the following: the application identifier, the IP address, and the port number.

In an example, the information #B includes one or more FQDNs, and the one or more FQDNs represent FQDNs corresponding to services that are allowed to be traffic-routed in the visited network (or represent FQDNs corresponding to services that are allowed to use the ECS option of the VPLMN). In a possible implementation, the information #B includes two information elements. One information element indicates that traffic routing is allowed in the visited network, and the other information element includes the one or more FQDNs. The H-SMF may learn, based on the information #B, that the services corresponding to the one or more FQDNs are allowed to be traffic-routed in the visited network. In another possible implementation, the information #B includes the one or more FQDNs, and the H-SMF determines, based on internal logic, that the services corresponding to the one or more FQDNs are allowed to be traffic-routed in the visited network.

In another example, the information #B includes one or more FQDNs, and the one or more FQDNs represent FQDNs corresponding to services that are not allowed to be traffic-routed in the visited network (or represent FQDNs corresponding to services that are not allowed to use the ECS option of the VPLMN). In a possible implementation, the information #B includes two information elements. One information element indicates that traffic routing is not allowed in the visited network, and the other information element includes the one or more FQDNs. The H-SMF may learn, based on the information #B, that the services corresponding to the one or more FQDNs are not allowed to be traffic-routed in the visited network. In another possible implementation, the information #B includes the one or more FQDNs, and the H-SMF determines, based on internal logic, that the services corresponding to the one or more FQDNs are not allowed to be traffic-routed in the visited network. In addition, further, the H-SMF may learn, based on the information #B, that a service corresponding to another FQDN (namely, an FQDN other than the one or more FQDNs) is allowed to be traffic-routed in the visited network.

In another example, the information #B includes one or more FQDNs #1 and one or more FQDNs #2, the one or more FQDNs #1 represent FQDNs corresponding to services that are allowed to be traffic-routed in the visited network, and the one or more FQDNs #2 represent FQDNs corresponding to services that are not allowed to be traffic-routed in the visited network. In a possible implementation, the information #B includes three information elements. One information element indicates that the services corresponding to the FQDNs #1 are allowed to be traffic-routed in the visited network, another information element includes the one or more FQDNs #1, and the remaining information element includes the one or more FQDNs #2. The H-SMF may learn, based on the information #B, that the services corresponding to the one or more FQDNs #1 are allowed to be traffic-routed in the visited network, and the services corresponding to the one or more FQDNs #2 are not allowed to be traffic-routed in the visited network. In another possible implementation, the information #B includes three information elements. One information element indicates that the services corresponding to the FQDNs #2 are not allowed to be traffic-routed in the visited network, another information element includes the one or more FQDNs #1, and the remaining information element includes the one or more FQDNs #2. The H-SMF may learn, based on the information #B, that the services corresponding to the one or more FQDNs #1 are allowed to be traffic-routed in the visited network, and the services corresponding to the one or more FQDNs #2 are not allowed to be traffic-routed in the visited network. In another possible implementation, the information #B includes two information elements. One information element includes the one or more FQDNs #1, and the other information element includes the one or more FQDNs #2. The H-SMF determines, based on internal logic, that the services corresponding to the one or more FQDNs #1 are allowed to be traffic-routed in the visited network, and the services corresponding to the one or more FQDNs #2 are not allowed to be traffic-routed in the visited network.

Optionally, there is a correspondence between the information #B and a PLMN.

For example, the information #B may be associated with the PLMN. The PLMN is determined, so that the information #B corresponding to (or associated with) the PLMN can be determined. For example, the information #B may exist in a form of Table 1.

TABLE 1

| PLMN identifier (identifier, ID) | Information #B |
| --- | --- |
| PLMN #1 | Information #B1 |
| PLMN #2 | Information #B2 |
| PLMN #3 | Information #B3 |

Table 1 is used as an example. For example, if it is determined that the PLMN is the PLMN #2, it may be learned that the information #B corresponding to the PLMN is the information #B2.

In a possible case, the PLMN ID in Table 1 may be a VPLMN ID. For example, if it is determined that the VPLMN is the PLMN #2, it may be learned that information #B corresponding to the VPLMN is the information #B2. If the information #B2 indicates that local traffic routing is allowed in the PLMN #2, local traffic routing may be performed in the VPLMN.

In another possible case, the PLMN ID in Table 1 may be an HPLMN ID. For example, if it is determined that the HPLMN is the PLMN #1, it may be learned that information #B corresponding to the HPLMN is the information #B1. If the information #B1 indicates that the PLMN #1 allows local traffic routing in the VPLMN, local traffic routing may be performed in the VPLMN.

It should be understood that Table 1 is merely an example for description and does not limit the scope of this application. Any variation of Table 1 is applicable to this application. For example, the PLMN ID in Table 1 may alternatively be replaced with an SMF ID. For example, the PLMN #1 may be replaced with one or more SMF IDs (IDs of one or more SMFs corresponding to the PLMN #1).

Optionally, there is a correspondence between the PLMN and the information #A. For example, the correspondence is denoted as a correspondence #A. In other words, the information #A of the PLMN may be determined based on the PLMN and the correspondence #A. The ECS option may be determined based on the information #A. For example, the correspondence #A may exist in a form of Table 2.

TABLE 2

| PLMN ID | Information #A |
| --- | --- |
| PLMN #1 | Information #A1 |
| PLMN #2 | Information #A2 |
| PLMN #3 | Information #A3 |

Table 2 is used as an example. For example, if it is determined that the PLMN is the PLMN #2, it may be learned that the information #A corresponding to the PLMN is the information #A2. The ECS option may be determined based on the information #A2. For example, if the H-SMF determines that the PLMN is the PLMN #2, and determines that the information #A corresponding to the PLMN is the information #A2, the H-SMF may send the information #A2 to the H-EASDF, so that the H-EASDF determines the ECS option based on the information #A2.

It should be understood that Table 2 is merely an example for description and does not limit the scope of this application. Any variation of Table 2 is applicable to this application. For example, the PLMN ID in Table 2 may alternatively be replaced with an SMF ID. For example, the PLMN #2 may be replaced with one or more SMF IDs (IDs of one or more SMFs corresponding to the PLMN #2). For another example, the information #A in Table 2 may be replaced with the ECS option or the L-DNS server address.

Optionally, there is a correspondence between the PLMN, the information #B, and the information #A. For example, the correspondence is denoted as a correspondence #B. In other words, the information #B and the information #A that correspond to the PLMN may be determined based on the PLMN and the correspondence #B. The ECS option may be determined based on the information #A.

For example, Table 1 and Table 2 are used together. For example, if it is determined that the PLMN is the PLMN #1, it may be learned, based on Table 1, that the information #B corresponding to the PLMN is the information #B1, and it may be learned, based on Table 2, that the information #A corresponding to the PLMN is the information #A1. The ECS option may be determined based on the information #A1.

For another example, the correspondence #B may exist in a form of Table 3.

TABLE 3

| PLMN ID | Information #B | Information #A |
| --- | --- | --- |
| PLMN #1 | Information #B1 | Information #A1 |
| PLMN #2 | Information #B2 | Information #A2 |
| PLMN #3 | Information #B3 | Information #A3 |

Table 3 is used as an example. For example, if it is determined that the PLMN is the PLMN #2, it may be learned, based on Table 3, that the information #B corresponding to the PLMN is the information #B2, and the information #A corresponding to the PLMN is the information #A2. The ECS option may be determined based on the information #A2. For example, if the H-SMF determines that the PLMN is the PLMN #2, and determines that the information #A corresponding to the PLMN is the information #A2, the H-SMF may send the information #A2 to the H-EASDF, so that the H-EASDF determines the ECS option based on the information #A2.

It should be understood that Table 3 is merely an example for description and does not limit the scope of this application. Any variation of Table 3 is applicable to this application. For example, the PLMN ID in Table 3 may alternatively be replaced with an SMF ID. For example, the PLMN #1 may be replaced with one or more SMF IDs (IDs of one or more SMFs corresponding to the PLMN #1). For another example, the information #A in Table 3 may be replaced with the ECS option or the L-DNS server address.

Optionally, the method 300 further includes: The first session management network element obtains the information #B.

For example, the H-SMF may obtain the information #B at least in any one of the following manners.

Manner 1: The H-SMF receives the information #B.

For example, the H-SMF receives the information #B from an H-PCF or an AF. For example, the H-PCF or the AF sends the information #B to the H-SMF, and correspondingly, the H-SMF receives the information #B from the H-PCF or the AF. A condition for triggering the H-PCF or the AF to send the information #B to the H-SMF is not limited. For example, the trigger condition may be that the H-SMF sends an identifier of the VPLMN to the H-PCF or the AF. The following provides examples with reference to FIG. 5 to FIG. 11.

For another example, the H-SMF receives the information #B from an H-NRF. For example, the H-NRF sends the information #B to the H-SMF, and correspondingly, the H-SMF receives the information #B from the H-NRF. A condition for triggering the H-NRF to send the information #B to the H-SMF is not limited. For example, the trigger condition may be that the H-SMF sends an identifier of the VPLMN to the H-NRF. The following provides examples with reference to FIG. 5 to FIG. 11.

For another example, the H-SMF receives the information #B from a V-SMF. For example, the V-SMF sends the information #B to the H-SMF, and correspondingly, the H-SMF receives the information #B from the V-SMF.

Manner 2: The H-SMF locally configures the information #B.

For example, a locally configured roaming protocol includes the information #B corresponding to the VPLMN, and the H-SMF directly obtains, according to the locally configured roaming protocol, the information #B corresponding to the VPLMN.

For another example, a locally configured roaming protocol includes one or more pieces of information #B, and the H-SMF obtains the information #B according to the locally configured roaming protocol. The one or more pieces of information #B may be information #B corresponding to one or more PLMNs. The H-SMF may first determine the VPLMN, and then obtain the corresponding information #B based on the VPLMN. It should be noted that the H-SMF may determine the information #B based on a message received from the V-SMF and a local configuration. The message may be an Nsmf_PDUSession_Create Request message, an Nsmf_PDUSession_Update Request message, or the like. This is not limited in this application.

Optionally, the information #B may exist in the H-SMF in the form of Table 1. Table 1 is used as an example. For example, if the H-SMF determines that the VPLMN is the PLMN #2, it may be learned that the information #B corresponding to the VPLMN is the information #B2. If the information #B2 indicates that local traffic routing is allowed in the PLMN #2, local traffic routing may be performed in the VPLMN.

Optionally, there is a correspondence (for example, the correspondence #A) between the VPLMN and the information #A. In other words, the information #A of the VPLMN may be determined based on the VPLMN and the correspondence #A. Table 2 is used as an example. In a possible case, the PLMN ID in Table 2 may be the VPLMN ID. For example, if the H-SMF determines that the VPLMN is the PLMN #2, it may be learned that the information #A corresponding to the VPLMN is the information #A2.

A manner in which the H-SMF determines the VPLMN is not limited in this application. For example, the H-SMF may identify the VPLMN based on an identifier of a network element deployed in the VPLMN (for example, an identifier of the V-SMF or an identifier of another network element). In a possible manner, the H-SMF receives the identifier of the V-SMF (for example, a V-SMF ID, which is not limited in this application), and the H-SMF determines the identifier of the VPLMN based on the identifier of the V-SMF, that is, determines the VPLMN. In another possible manner, the H-SMF receives the identifier of the VPLMN from the V-SMF. In still another possible manner, the H-SMF receives the message from the V-SMF, and determines the identifier of the VPLMN based on the message. The message may be the Nsmf_PDUSession_Create Request message, the Nsmf_PDUSession_Update Request message, or the like. This is not limited in this application.

The foregoing two manners are examples for description. Any manner in which the H-SMF can obtain the information #B is applicable to embodiments of this application.

Optionally, in step 310, that a first session management network element obtains information #A includes: The first session management network element determines the information #A, or the first session management network element receives the information #A.

The following provides descriptions by using an example in which the first session management network element is the H-SMF.

Manner 1: The H-SMF receives the information #A from the V-SMF.

For example, the V-SMF may actively deliver the information #A. For example, an HR session establishment procedure is reused, and the V-SMF sends the Nsmf_PDUSession_Create Request message to the H-SMF, where the message includes the information #A.

For another example, the V-SMF may send the information #A to the H-SMF based on a request of the H-SMF. Further, optionally, the method 300 further includes: The H-SMF sends request information #1 (namely, an example of first request information) to the V-SMF, where the request information #1 is used to request the information #A.

An implementation of the request information #1 is not limited in this application. In a possible manner, the request information #1 may be the information #B. In other words, the H-SMF sends the information #B to the V-SMF, where the information #B is used to request the information #A. In another possible manner, the request information #1 may be implemented by using one or more bits. For example, the information #A is requested by using a field of the one or more bits. In another possible manner, the request information #1 has a function of requesting the information #A. In other words, when receiving the request information #1, the V-SMF sends the information #A to the H-SMF.

Manner 2: The H-SMF receives the information #A from the H-NRF.

For example, the H-NRF may send the information #A to the H-SMF based on a request of the H-SMF. Further, optionally, the method 300 further includes: The H-SMF sends request information #2 (namely, an example of second request information) to the H-NRF, where the request information #2 is used to request the information #A. In a first possible case, after receiving the request information #2, the H-NRF may determine the information #A based on the local configuration. In this case, the H-NRF directly sends a response to the request information #2 to the H-SMF, where the response carries the information #A. In a second possible case, after receiving the request information #2, the H-NRF may receive the information #A from a V-NRF.

An implementation of the request information #2 is not limited in this application. In a possible manner, the request information #2 may be the information #B. In other words, the H-SMF sends the information #B to the H-NRF, where the information #B is used to request the information #A. In another possible manner, the request information #2 may be implemented by using one or more bits. For example, the information #A is requested by using a field of the one or more bits. In another possible manner, the request information #2 has a function of requesting the information #A. In other words, when receiving the request information #2, the H-NRF sends the information #A to the H-SMF. In the foregoing possible manners, a request message #2 may further include the identifier of the VPLMN, for example, the VPLMN ID.

Manner 3: The H-SMF determines the information #A.

For example, the VPLMN may correspond to one or more pieces of information #A.

The H-SMF may first determine the VPLMN, and then determine, based on the correspondence (for example, the correspondence #A) between the VPLMN and the information #A, the information #A corresponding to the VPLMN.

A manner in which the H-SMF determines the VPLMN is not limited in this application. For example, the H-SMF may identify the VPLMN based on an identifier of a network element deployed in the VPLMN (for example, the identifier of the V-SMF or an identifier of another network element). In a possible manner, the H-SMF receives the identifier of the V-SMF (for example, the V-SMF ID, which is not limited in this application), and the H-SMF determines the identifier of the VPLMN based on the identifier of the V-SMF, that is, determines the VPLMN. In another possible manner, the H-SMF receives the identifier of the VPLMN from the V-SMF. In still another possible manner, the H-SMF receives the message from the V-SMF, and determines the identifier of the VPLMN based on the message. The message may be the Nsmf_PDUSession_Create Request message, the Nsmf_PDUSession_Update Request message, or the like. This is not limited in this application.

For another example, the V-SMF may correspond to one or more pieces of information #A.

The H-SMF may first determine the V-SMF, and then determine, based on a correspondence between the V-SMF and the information #A, the information #A corresponding to the V-SMF. For example, the H-SMF receives the identifier of the V-SMF (for example, the V-SMF ID, which is not limited in this application), and the H-SMF determines, based on the identifier of the V-SMF, the information #A corresponding to the V-SMF.

The foregoing several possible manners are examples for description, and are not limited thereto. Any manner in which the H-SMF can determine the information #A is applicable to this application.

As described above, the information #B may include the identifier of the first service, for example, the FQDN (or the FQDN range), the application identifier, the IP address, or the port number. If the H-SMF locally configures the information #B and receives the information #B, the H-SMF may determine the information #A based on the locally configured information #B and/or the received information #B. The following mainly uses the FQDN as an example for description. It may be understood that the FQDN may alternatively be replaced with any one of the following: the application identifier, the IP address, and the port number.

It is assumed that the information #B locally configured by the H-SMF is denoted as first information #B (namely, an example of first indication information), and the information #B received by the H-SMF is denoted as second information #B (namely, an example of second indication information). If the first information #B includes an FQDN, the FQDN is represented by an FQDN #3. If the second information #B includes an FQDN, the FQDN is represented by an FQDN #4.

The FQDN #3 may include one or more FQDNs. The FQDN #3 includes an FQDN corresponding to a service that is allowed to be traffic-routed in the VPLMN (or an FQDN corresponding to a service that is allowed to use the ECS option of the VPLMN), and/or an FQDN corresponding to a service that is not allowed to be traffic-routed in the VPLMN (or an FQDN corresponding to a service that is not allowed to use the ECS option of the VPLMN).

The FQDN #4 may include one or more FQDNs. The FQDN #4 includes an FQDN corresponding to a service that is allowed to be traffic-routed in the VPLMN (or an FQDN corresponding to a service that is allowed to use the ECS option of the VPLMN), and/or an FQDN corresponding to a service that is not allowed to be traffic-routed in the VPLMN (or an FQDN corresponding to a service that is not allowed to use the ECS option of the VPLMN).

The following respectively provides descriptions with reference to several possible cases.

Case 1: The first information #B includes the FQDN #3, and the second information #B includes the FQDN #4.

Based on Case 1, in a possible manner, the H-SMF determines that a target FQDN is the FQDN #4. For example, the information #A may be used to determine the ECS option for a DNS query corresponding to the FQDN #4 and/or add the ECS option to the DNS query. For example, based on this manner, when an FQDN of a service matches the target FQDN (namely, the FQDN #4), the service is allowed to use the ECS option of the VPLMN. For example, UE sends a DNS query message requesting an edge service (or requesting an edge server address). If an FQDN included in the DNS query message matches the FQDN #4, the ECS option may be added to the DNS query message.

Based on Case 1, in another possible manner, the H-SMF determines that a target FQDN is an intersection set (for example, denoted as an FQDN #5) of the FQDN #3 and the FQDN #4. For example, the information #A may be used to determine the ECS option for a DNS query corresponding to the FQDN #5 and/or add the ECS option to the DNS query. For example, based on this manner, when an FQDN of a service matches the target FQDN (namely, the FQDN #5), the service is allowed to use the ECS option of the VPLMN. For example, UE sends a DNS query message requesting an edge service (or requesting an edge server address). If an FQDN included in the DNS query message matches the FQDN #5, the ECS option may be added to the DNS query message.

Based on Case 1, in another possible manner, the H-SMF determines that a target FQDN is the FQDN #3. For example, the information #A may be used to determine the ECS option for a DNS query corresponding to the FQDN #3 and/or add the ECS option to the DNS query. For example, based on this manner, when an FQDN of a service matches the target FQDN (namely, the FQDN #3), the service is allowed to use the ECS option of the VPLMN. For example, UE sends a DNS query message requesting an edge service (or requesting an edge server address). If an FQDN included in the DNS query message matches the FQDN #3, the ECS option may be added to the DNS query message.

Based on Case 1, in another possible manner, the H-SMF determines that a target FQDN is a union set (for example, denoted as an FQDN #6) of the FQDN #3 and the FQDN #4. For example, the information #A may be used to determine the ECS option for a DNS query corresponding to the FQDN #6 and/or add the ECS option to the DNS query. For example, based on this manner, when an FQDN of a service matches the target FQDN (namely, the FQDN #6), the service is allowed to use the ECS option of the VPLMN. For example, UE sends a DNS query message requesting an edge service (or requesting an edge server address). If an FQDN included in the DNS query message matches the FQDN #6, the ECS option may be added to the DNS query message.

Based on Case 1, in another possible manner, the H-SMF determines that a target FQDN is an FQDN #7. The FQDN #7 is determined by the H-SMF based on the FQDN #3 and the FQDN #4, and is not limited to any one of the foregoing FQDN #3, FQDN #4, FQDN #5, and FQDN #6. For example, the information #A may be used to determine the ECS option for a DNS query corresponding to the FQDN #7 and/or add the ECS option to the DNS query. For example, based on this manner, when an FQDN of a service matches the target FQDN (namely, the FQDN #7), the service is allowed to use the ECS option of the VPLMN. For example, UE sends a DNS query message requesting an edge service (or requesting an edge server address). If an FQDN included in the DNS query message matches the FQDN #7, the ECS option may be added to the DNS query message.

Case 2: The first information #B does not include the FQDN #3, and the second information #B includes the FQDN #4.

Based on Case 2, in a possible manner, the H-SMF determines that a target FQDN is the FQDN #4. For example, the information #A may be used to determine the ECS option for a DNS query corresponding to the FQDN #4 and/or add the ECS option to the DNS query. For example, based on this manner, when an FQDN of a service matches the target FQDN (namely, the FQDN #4), the service is allowed to use the ECS option of the VPLMN. For example, UE sends a DNS query message requesting an edge service (or requesting an edge server address). If an FQDN included in the DNS query message matches the FQDN #4, the ECS option may be added to the DNS query message.

Case 3: The first information #B includes the FQDN #3, and the second information #B does not include the FQDN #4.

Based on Case 3, in a possible manner, the H-SMF determines that a target FQDN is the FQDN #3. For example, the information #A may be used to determine the ECS option for a DNS query corresponding to the FQDN #3 and/or add the ECS option to the DNS query. For example, based on this manner, when an FQDN of a service matches the target FQDN (namely, the FQDN #3), the service is allowed to use the ECS option of the VPLMN. For example, UE sends a DNS query message requesting an edge service (or requesting an edge server address). If an FQDN included in the DNS query message matches the FQDN #3, the ECS option may be added to the DNS query message.

Based on Case 3, in another possible manner, the H-SMF determines that a target FQDN includes an FQDN of a service that is not deployed at an HPLMN edge, or the H-SMF determines that the target FQDN includes all FQDNs. It should be noted that the determining action is optional. For example, the information #A may be used to determine the ECS option for a DNS query corresponding to the target FQDN (for example, the FQDN of the service that is not deployed at the HPLMN edge) and/or add the ECS option to the DNS query. For example, based on this manner, when an FQDN of a service matches the target FQDN, the service is allowed to use the ECS option of the VPLMN. For example, UE sends a DNS query message requesting an edge service (or requesting an edge server address). If an FQDN included in the DNS query message matches the target FQDN, the ECS option may be added to the DNS query message. It may be understood that, in this case, the H-SMF may not send the FQDN to the H-EASDF.

Case 4: The first information #B does not include the FQDN #3, and the second information #B does not include the FQDN #4.

Based on Case 4, in a possible manner, the H-SMF determines that a target FQDN includes an FQDN of a service that is not deployed at an HPLMN edge, or the H-SMF determines that the target FQDN includes all FQDNs. It should be noted that the determining action is optional. For example, the information #A may be used to determine the ECS option for a DNS query corresponding to the target FQDN (for example, the FQDN of the service that is not deployed at the HPLMN edge) and/or add the ECS option to the DNS query. For example, based on this manner, when an FQDN of a service matches the target FQDN, the service is allowed to use the ECS option of the VPLMN. For example, UE sends a DNS query message requesting an edge service (or requesting an edge server address). If an FQDN included in the DNS query message matches the target FQDN, the ECS option may be added to the DNS query message. It may be understood that, in this case, the H-SMF may not send the FQDN to the EASDF.

In the foregoing four cases, determining the ECS option for the DNS query corresponding to the FQDN and/or adding the ECS option to the DNS query are/is mentioned, where the determining the ECS option represents determining the ECS option based on the information #A, and the adding represents adding the ECS option to the DNS query message (or may be the uplink packet).

It may be further understood that the foregoing mainly provides descriptions by using an example in which the information #A is the ECS option, and this application is not limited thereto. For example, the ECS option may alternatively be replaced with the L-DNS server address, and the action of adding the ECS option may alternatively be replaced with the action of forwarding the DNS query to the L-DNS server.

FIG. 4 is a schematic diagram of another communication method 400 according to an embodiment of this application. The method 400 may include the following steps.

410: A second session management network element obtains information #B, where the information #B indicates that traffic routing is allowed in a visited network.

The second session management network element is a network element deployed in a VPLMN. For example, the second session management network element is a V-SMF.

For the information #B, refer to related descriptions in the method 300. Details are not described herein again.

420: The second session management network element sends IP address information of the visited network to a user plane network element based on the information #B.

The user plane network element is a network element deployed in the VPLMN. For example, the user plane network element is a V-UPF or a V-EASDF, or may be a module in which the UPF and EASDF network elements are jointly deployed.

The IP address information (namely, information #A) is information used to determine an ECS option; the IP address information is an ECS option; or the IP address information is an IP address or a prefix of a subnet. Alternatively, information #A may refer to an L-DNS server address. For the information #A, refer to descriptions in the method 300. Details are not described herein again.

Based on the foregoing technical solution, the second session management network element deployed in the visited network may send the IP address information (for example, the information used to determine the ECS option; in another example, the ECS option or the L-DNS server address) of the visited network to the user plane network element based on indication information. In this way, after a terminal device accesses the visited network through HR roaming, the terminal device may access a service in the visited network by using the IP address information. For example, the user plane network element may add, to a DNS query message, the ECS option determined based on the IP address information, or the user plane network element sends, to an edge application server discovery network element, the ECS option or the information used to determine the ECS option, and the edge application server discovery network element may add the ECS option to the DNS query message. A manner in which the user plane network element sends, to the edge application server discovery network element, the ECS option or the information used to determine the ECS option is not limited. For example, the sending may be performed by using an uplink packet, or the DNS query message may be forwarded to an L-DNS server. In this way, a local EAS in an HR roaming scenario can be discovered.

Optionally, the method 400 further includes: The second session management network element obtains the information #B.

For example, the V-SMF may obtain the information #B at least in any one of the following manners.

Manner 1: The V-SMF receives the information #B.

For example, the V-SMF receives the information #B from an H-SMF. For example, the H-SMF sends the information #B to the V-SMF, and correspondingly, the V-SMF receives the information #B from the H-SMF. The information #B may be sent by using Nsmf PDUSession_Create Response, Nsmf_PDUSession_Update Response, or the like. This is not limited in this application.

For another example, the V-SMF receives the information #B from a V-PCF or an AF. For example, the V-PCF or the AF sends the information #B to the V-SMF, and correspondingly, the V-SMF receives the information #B from the V-PCF or the AF.

Manner 2: The V-SMF locally configures the information #B.

For example, a locally configured roaming protocol includes information #B corresponding to an HPLMN, and the V-SMF directly obtains, according to the locally configured roaming protocol, the information #B corresponding to the HPLMN.

For another example, a locally configured roaming protocol includes one or more pieces of information #B, and the V-SMF obtains the information #B according to the locally configured roaming protocol. The one or more pieces of information #B may be information #B corresponding to one or more PLMNs. The V-SMF may first determine an HPLMN, and then obtain corresponding information #B based on the HPLMN.

Optionally, the information #B may exist in the V-SMF in a form of Table 1. Table 1 is used as an example. For example, if the V-SMF determines that the HPLMN is the PLMN #2, it may be learned that the information #B corresponding to the HPLMN is the information #B2. If the information #B2 indicates that the PLMN #2 allows local traffic routing in the VPLMN, local traffic routing may be performed in the VPLMN.

A manner in which the V-SMF determines the HPLMN is not limited in this application. For example, the V-SMF may identify the HPLMN based on an identifier of a network element deployed in the HPLMN (for example, an identifier of the H-SMF or an identifier of another network element). In a possible manner, the V-SMF receives the identifier of the H-SMF (for example, an H-SMF ID, which is not limited in this application) from an AMF, and the V-SMF determines an identifier of the HPLMN based on the identifier of the H-SMF, that is, determines the HPLMN. In another possible manner, the V-SMF receives an identifier of the HPLMN from an AMF.

The foregoing two manners are examples for description. Any manner in which the V-SMF can obtain the information #B is applicable to embodiments of this application.

Optionally, the method 400 further includes: The second session management network element obtains the information #A.

In a possible manner, the second session management network element obtains the IP address information of the visited network based on the information #B, where the information #B indicates that traffic routing is allowed in the visited network. For example, if the V-SMF learns, based on the information #B, that traffic routing is allowed in the VPLMN, the V-SMF obtains the information #A. The information #B may be further described as indicating (representing or indicating) that traffic routing is allowed.

It may be understood that the foregoing is an example for description, and this application is not limited thereto. For example, the second session management network element may alternatively obtain the IP address information of the visited network based on a request. For example, the V-SMF may determine the information #A based on a request of the H-SMF.

Optionally, the method 400 further includes: The second session management network element determines the information #A.

The following uses an example in which the second session management network element is the V-SMF.

Manner 1: The V-SMF receives the information #A from a V-NRF.

For example, the V-NRF may send the information #A to the V-SMF based on a request of the V-SMF. Further, optionally, the method 400 further includes: The V-SMF sends request information #3 to the V-NRF, where the request information #3 is used to request the information #A. In a first possible case, after receiving the request information #3, the V-NRF may determine the information #3 based on a local configuration. In this case, the V-NRF directly sends a response to the request information #3 to the V-SMF, where the response carries the information #A.

An implementation of the request information #2 is not limited in this application. In a possible manner, the request information #2 may be the information #B. In other words, the H-SMF sends the information #B to the H-NRF, where the information #B is used to request the information #A. In another possible manner, the request information #2 may be implemented by using one or more bits. For example, the information #A is requested by using a field of the one or more bits. In another possible manner, the request information #2 has a function of requesting the information #A. In other words, when receiving the request information #2, the H-NRF sends the information #A to the H-SMF. In the foregoing possible manners, a request message #2 may further include an identifier of the VPLMN, for example, a VPLMN ID.

Manner 2: The V-SMF determines the information #A.

For example, the HPLMN may correspond to one or more pieces of information #A.

The V-SMF may first determine the HPLMN, and then determine, based on a correspondence (for example, a correspondence #A) between the HPLMN and the information #A, the information #A corresponding to the HPLMN.

A manner in which the V-SMF determines the HPLMN is not limited in this application. For example, the V-SMF may identify the HPLMN based on an identifier of a network element deployed in the HPLMN (for example, the identifier of the H-SMF or an identifier of another network element). In a possible manner, the V-SMF receives the identifier of the H-SMF (for example, the H-SMF ID, which is not limited in this application), and the V-SMF determines the identifier of the HPLMN based on the identifier of the H-SMF, that is, determines the HPLMN. In another possible manner, the V-SMF receives the identifier of the HPLMN.

For another example, the H-SMF may correspond to one or more pieces of information #A.

The V-SMF may first determine the H-SMF, and then determine, based on a correspondence between the H-SMF and the information #A, the information #A corresponding to the H-SMF. For example, the V-SMF receives the identifier of the H-SMF (for example, the H-SMF ID, which is not limited in this application), and the V-SMF determines, based on the identifier of the H-SMF, the information #A corresponding to the H-SMF.

The foregoing several possible manners are examples for description, and are not limited thereto. Any manner in which the V-SMF can determine the information #A is applicable to this application.

Optionally, the information #B includes an identifier of a second service, and the information #B indicates that the second service is allowed to be traffic-routed in the visited network. Optionally, the second session management network element may further send the identifier of the second service to the user plane network element. The identifier of the second service and the information #A may be carried in same signaling, or may be separately sent. This is not limited in this application. For example, the identifier of the second service may be any one of the following: an FQDN (or an FQDN range), an application identifier, an IP address, and a port number. For details, refer to related descriptions in the method 300. Details are not described herein again.

If the V-SMF locally configures the information #B and receives the information #B, the V-SMF may determine the information #A based on the locally configured information #B and/or the received information #B. For details, refer to descriptions of the Cases 1 to 4 in the method 300. Details are not described herein again.

Optionally, the method 400 further includes the following processing manner after the user plane network element receives the information #A.

For example, after receiving a DNS query, the user plane network element adds, to the DNS query, the ECS option determined based on the information #A. For example, after receiving the DNS query, if determining that the DNS query is a DNS query corresponding to a packet of the second service, the user plane network element adds, to the DNS query, the ECS option determined based on the information #A.

For another example, after receiving a DNS query, the user plane network element forwards the DNS query to the L-DNS server. For example, the information #A is the L-DNS server address. After receiving the DNS query, if determining that the DNS query is a DNS query corresponding to a packet of the second service, the user plane network element forwards the DNS query to the L-DNS server.

For another example, after receiving a DNS query, the user plane network element requests an EASDF to add, to the DNS query, the ECS option determined based on the information #A. Alternatively, after receiving the information #A, the user plane network element sends the information #A to the EASDF, so that the EASDF performs processing.

For another example, the user plane network element sends the information #A to an EASDF, where the EASDF may be an H-EASDF. For example, the user plane network element adds the information #A to a GTP-U packet header, and sends the information #A to the EASDF by using a user plane packet.

For another example, the user plane network element determines the ECS option based on the information #A, and then sends the ECS option to an EASDF, where the EASDF may be an H-EASDF. For example, the user plane network element adds the ECS option to a GTP-U packet header, and sends the information #A to the EASDF by using a user plane packet.

It may be understood that the foregoing are some examples for description, however, the application is not limited to them.

For ease of understanding, the following mainly uses an example in which the information #A is the information used to determine the ECS option to describe embodiments of this application with reference to FIG. 5 to FIG. 11. As described above, the information #B may be further described as an authorization policy. In the following example, it is assumed that the authorization policy is used as an example for description. It may be understood that the authorization policy is the information #B described above. For details about related steps, refer to the foregoing descriptions.

Figure 5:
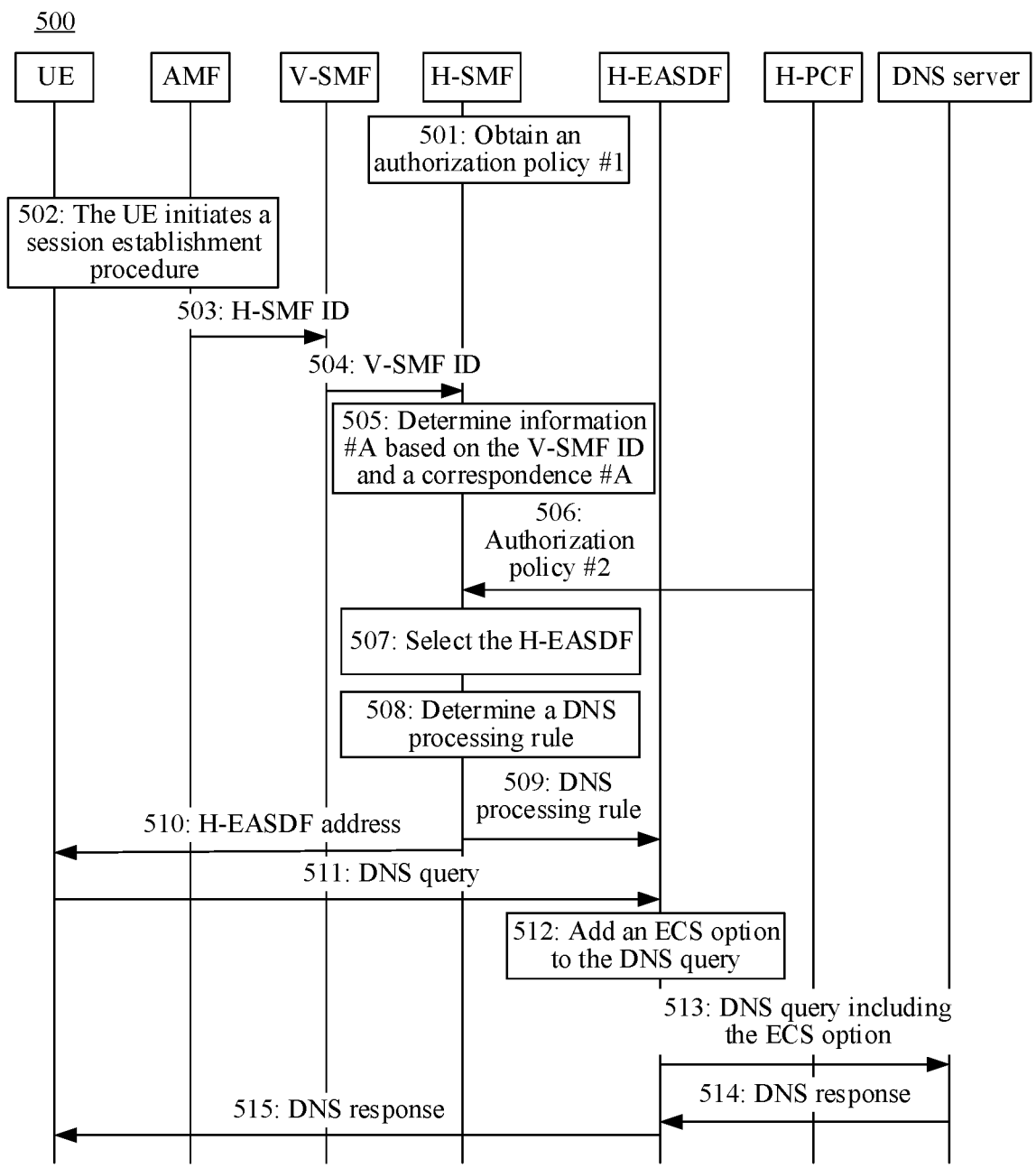
FIG. 5 is a schematic flowchart of a communication method 500 according to an embodiment of this application.

FIG. 5 is a schematic flowchart of a communication method 500 according to an embodiment of this application. The method 500 may be used to implement a solution of the method 300. For example, the method 500 may be applied to a scenario in which an H-SMF determines information #A based on a local configuration and an H-EASDF adds the information #A to a DNS query. The method 500 may include the following steps.

501: The H-SMF obtains an authorization policy #1.

The authorization policy #1 indicates whether traffic routing is allowed in a VPLMN (or the authorization policy #1 indicates whether traffic routing is allowed). For the authorization policy #1, refer to descriptions about the information #B in the method 300. Details are not described herein again.

The H-SMF may obtain the authorization policy #1 at least in any one of the following manners.

In a first possible manner, the H-SMF locally configures the authorization policy #1.

In a second possible manner, the H-SMF receives the authorization policy #1. For example, after a device is powered on, the authorization policy #1 is received from a V-SMF by using another procedure (for example, a session establishment procedure).

For a manner in which the H-SMF obtains the authorization policy #1, refer to the manner in which the first session management network element obtains the information #B in the method 300. Details are not described herein again.

Optionally, the H-SMF may further obtain a correspondence #A, where the correspondence #A may indicate a correspondence between the VPLMN and the information #A. For example, the authorization policy #1 includes the correspondence #A.

Optionally, the authorization policy #1 further includes a target FQDN #1 (or an FQDN range), and the target FQDN #1 may include one or more FQDNs. The target FQDN #1 includes an FQDN corresponding to a service that is allowed to be traffic-routed in the VPLMN (or an FQDN corresponding to a service that is allowed to use an ECS option of the VPLMN), and/or an FQDN corresponding to a service that is not allowed to be traffic-routed in the VPLMN (or an FQDN corresponding to a service that is not allowed to use the ECS option of the VPLMN). For example, the target FQDN #1 includes the FQDN corresponding to the service that is allowed to be traffic-routed in the VPLMN. When an FQDN of a service matches the target FQDN #1, the service is allowed to use the ECS option of the VPLMN. For example, UE sends a DNS query message requesting an edge service (or requesting an edge server address). If an FQDN included in the DNS query message matches the target FQDN #1, the ECS option may be added to the DNS query message.

502: The UE initiates a session establishment procedure.

In an HR roaming scenario, the UE may initiate an HR session establishment procedure. A specific session establishment procedure is not limited in this application. For example, the following manner may be used: After receiving a session establishment request of the UE, an AMF selects the V-SMF and the H-SMF that serve an HR session; and after receiving the session establishment request, the V-SMF and the H-SMF respectively select a V-UPF and an H-UPF that serve the HR session, create an N4 session, and send user plane tunnel information. If the session is successfully established, a network side returns a session establishment response to the UE, and then a packet may be transmitted through the HR session.

For details, refer to chapters such as 4.3.2.2.2 in the 3GPP standard TS 23.502, or a subsequent session establishment manner. This is not limited in this application.

It should be understood that step 502 is not limited to performing the complete HR session establishment procedure. A plurality of steps after step 502 may reuse the HR session establishment procedure; or a plurality of steps after step 502 may be performed in the HR session establishment procedure.

503: The AMF sends an H-SMF ID to the V-SMF.

The V-SMF may determine the H-SMF based on the H-SMF ID.

In a possible implementation, the HR session establishment procedure is reused. The AMF sends an Nsmf interface PDU session establishment session management context request (Nsmf_PDUSession_CreateSMContext Request) message to the V-SMF, where the message carries the H-SMF ID.

It should be understood that the Nsmf_PDUSession_CreateSMContext Request message is merely an example for description. This is not limited in this application.

504: The V-SMF sends a V-SMF ID to the H-SMF.

The H-SMF may determine a VPLMN ID based on the V-SMF ID, that is, determine the VPLMN.

In a possible implementation, the HR session establishment procedure is reused. The V-SMF sends an Nsmf interface ir PDU session establishment request (Nsmf_PDUSession_Create Request) message to the H-SMF, where the message carries the V-SMF ID.

It should be noted that the step may be further described as the following: The V-SMF sends the V-SMF ID and/or the VPLMN ID to the H-SMF. In this case, the H-SMF may directly determine the VPLMN ID.

In another possible implementation, the H-SMF may determine the VPLMN ID based on a message sent by the V-SMF.

It should be understood that the Nsmf_PDUSession_Create Request message is merely an example for description. This is not limited in this application.

505: The H-SMF determines the information #A based on the V-SMF ID and the correspondence #A.

In a possible implementation, the authorization policy #1 includes the correspondence #A, and the H-SMF determines the VPLMN ID based on the V-SMF ID, and further determines the information #A of the VPLMN based on the correspondence #A included in the authorization policy #1.

506: An H-PCF sends an authorization policy #2 to the H-SMF.

The authorization policy #2 indicates whether traffic routing is allowed in the VPLMN (or the authorization policy #1 indicates whether traffic routing is allowed). The authorization policy #2 sent by the H-PCF may be locally configured by the H-PCF, or may be provided by an AF. For example, the AF may provide the authorization policy #2 for the H-PCF by using an AF request. For the authorization policy #2, refer to descriptions about the information #B in the method 300. Details are not described herein again.

Optionally, the authorization policy #2 further includes a target FQDN #2 (or an FQDN range), and the target FQDN #2 may include one or more FQDNs. The target FQDN #2 includes an FQDN corresponding to a service that is allowed to be traffic-routed in the VPLMN (or an FQDN corresponding to a service that is allowed to use the ECS option of the VPLMN), and/or an FQDN corresponding to a service that is not allowed to be traffic-routed in the VPLMN (or an FQDN corresponding to a service that is not allowed to use the ECS option of the VPLMN). For example, the target FQDN #2 includes the FQDN corresponding to the service that is allowed to be traffic-routed in the VPLMN. When an FQDN of a service matches the target FQDN #2, the service is allowed to use the ECS option of the VPLMN. It may be understood that the target FQDN #2 herein may be the same as or different from the target FQDN #1 in step 501. This is not limited in this application.

In a possible implementation, the HR session establishment procedure is reused. This is implemented by using a session management (SM) policy association procedure. For example, a PDU session may be established or modified by using SM signaling. In a procedure of establishing or modifying the PDU session according to an SM policy, the H-PCF sends the authorization policy #2 to the H-SMF.

Specifically, in a possible implementation, after receiving the Nsmf_PDUSession_Create Request message from the V-SMF in step 504, the H-SMF triggers H-PCF selection. After the H-PCF selection is completed, an SM policy association establishment procedure or an SM policy association modification procedure is triggered. In the SM policy association establishment procedure, the H-SMF sends an Npcf interface SM policy control establishment request (Npcf_SMPolicyControl_Create Request) message to the H-PCF. The message may include one or more of the following: a subscription permanent identifier (SUPI) or a permanent equipment identifier (PEI) of the UE, a PDU session identifier, a data network name (DNN), single network slice selection assistance information (S-NSSAI), a radio access technology (RAT) type, and the like. After receiving the message, the H-PCF determines the authorization policy #2 based on the local configuration or subscription information of the UE and/or subscription information of the session that are/is obtained from a UDR, and sends the authorization policy #2 to the H-SMF by using an Npcf interface SM policy control establishment response (Npcf_SMPolicyControl_Create Response) message. It may be understood that the foregoing is merely an example for description for ease of understanding. This is not limited in this application.

It should be noted that the H-SMF may locally configure the authorization policy. For example, if the H-SMF locally configures the authorization policy #1 in step 501, the H-PCF may not send the authorization policy #2 to the H-SMF, in other words, step 506 does not need to be performed.

507: The H-SMF selects the H-EASDF.

A specific manner in which the H-SMF selects the H-EASDF is not limited in this application.

For example, when selecting the H-EASDF, the H-SMF may refer to one or more of the following information: the S-NSSAI, an EASDF location, an EASDF IP address, a PSA IP address, and a DNAI. It may be understood that, when selecting a V-EASDF, the H-SMF may refer to one or more of the foregoing information, or may refer to other information that is not listed. This is not limited in this application.

For example, the H-SMF may select the H-EASDF at least in any one of the following manners.

In a manner, the H-SMF may select the H-EASDF based on the local configuration.

In another manner, the H-SMF obtains the H-EASDF from an H-NRF. For example, the H-SMF sends a request message to the H-NRF, and the H-NRF returns information (including, for example, an address and an identifier) about one or more H-EASDFs to the H-SMF. If the H-NRF returns a plurality of H-EASDFs to the H-SMF, the H-SMF may select one of the H-EASDFs.

508: The H-SMF determines a DNS processing rule.

The H-SMF may determine (or formulate) the DNS processing rule based on the information #A determined in step 505. Specifically, the DNS processing rule may include the information #A determined in step 505, the information #A is used by the H-EASDF to determine the ECS option, and further, the DNS processing rule may be used to add the ECS option to the DNS query.

Optionally, the H-SMF determines the DNS processing rule according to an authorization policy. For example, if the authorization policy indicates that traffic routing is allowed in the VPLMN, the H-SMF may determine the DNS processing rule based on the information #A. The authorization policy may be the authorization policy #2 received by the H-SMF in step 506, the authorization policy locally configured by the H-SMF (for example, the authorization policy #1 obtained in step 501), or an authorization policy #3 determined by the H-SMF according to the authorization policy #1 and/or the authorization policy #2. This is not limited in this application.

In an example, the H-SMF determines the DNS processing rule according to the authorization policy #1 in step 501. In a possible case, the authorization policy #1 includes the target FQDN #1. In this case, the DNS processing rule may further include the target FQDN #1, and indicates the H-EASDF to detect the DNS query message. When an included FQDN matches the target FQDN #1 in the DNS processing rule, the ECS option is added to the DNS query message. In another possible case, the authorization policy #1 does not include the target FQDN #1. In this case, the DNS processing rule may indicate to add the ECS option to a DNS query message of an FQDN range of a service that is not deployed at an HPLMN edge.

In another example, the H-SMF determines the DNS processing rule according to the authorization policy #2 in step 506. In a possible case, the authorization policy #2 includes the target FQDN #2. In this case, the DNS processing rule may further include the target FQDN #2, and indicates the H-EASDF to detect the DNS query message. When an included FQDN matches the target FQDN #2 in the DNS processing rule, the ECS option is added to the DNS query message. In another possible case, the authorization policy #2 does not include the target FQDN #2. In this case, the DNS processing rule may indicate to add the ECS option to a DNS query message of an FQDN range of a service that is not deployed at an HPLMN edge.

It may be understood that the foregoing examples are examples for description. For details, refer to the cases 1 to 4 in the method 300. Details are not described herein again.

509: The H-SMF sends the DNS processing rule to the H-EASDF.

510: The H-SMF sends an H-EASDF address to the UE.

In a possible implementation, the H-SMF sends the H-EASDF address to the UE via the AMF. For example, the H-SMF sends an N1 message to the UE via the AMF, where the N1 message includes an N1 SM container, and the N1 SM container carries the H-EASDF address. For example, the H-SMF sends the H-EASDF address to the AMF by using an Namf_Communication_N1N2MessageTransfer message, and then the AMF sends the H-EASDF address to the UE by using a non-access stratum (NAS) message. The UE and the AMF may interact with each other through an N1 interface, where an interaction message may be, for example, referred to as a NAS message.

511: The UE sends the DNS query to the H-EASDF.

For example, the UE sends the DNS query message to the H-EASDF through a user plane via a RAN and the UPF.

512: The H-EASDF adds the ECS option to the DNS query.

The H-EASDF may determine the ECS option based on the information #A, and then add the ECS option to the DNS query according to the DNS processing rule received in step 509.

In a possible manner, the H-EASDF may directly determine the ECS option based on the information #A received from the H-SMF, and further add the ECS option to the DNS query.

In another possible manner, the H-EASDF may request, from the H-SMF, the ECS option or the information used to determine the ECS option. After receiving, from the H-SMF, the ECS option or the information used to determine the ECS option, the H-EASDF determines the ECS option and adds the ECS option to the DNS query. Optionally, when the H-EASDF requests the ECS option from the H-SMF, the FQDN included in the DNS query may be carried. In a possible implementation, the H-EASDF sends an Neasdf_DNSContext_Notify Request message to the H-SMF, where the message may include the FQDN included in the DNS query, and receives an Neasdf_DNSContext_Notify Response message from the H-SMF. The H-SMF sends an Neasdf_DNSContext_Update Request message to the H-EASDF, where the message includes the ECS option or the information used to determine the ECS option, and receives an Neasdf_DNSContext_Update Response message from the H-EASDF.

513: The H-EASDF sends, to a DNS server, a DNS query including the ECS option.

After adding the ECS option to the DNS query, the H-EASDF sends the DNS query message (the DNS query message to which the ECS option has been added) to the DNS server.

514: The DNS server sends a DNS response to the H-EASDF.

The DNS server may send the DNS response message to the V-EASDF, where the DNS response message may include address information, for example, an EAS IP address or an FQDN.

515: The H-EASDF sends the DNS response to the UE.

After receiving the DNS response message, the H-EASDF may forward the DNS response message to the UE.

According to the method 500, the H-SMF determines the information #A based on the local configuration, to further determine the ECS option. The H-EASDF adds the ECS option to the DNS query, and further receives an address of a local EAS from the DNS server, so that the local EAS is discovered.

Figure 6:
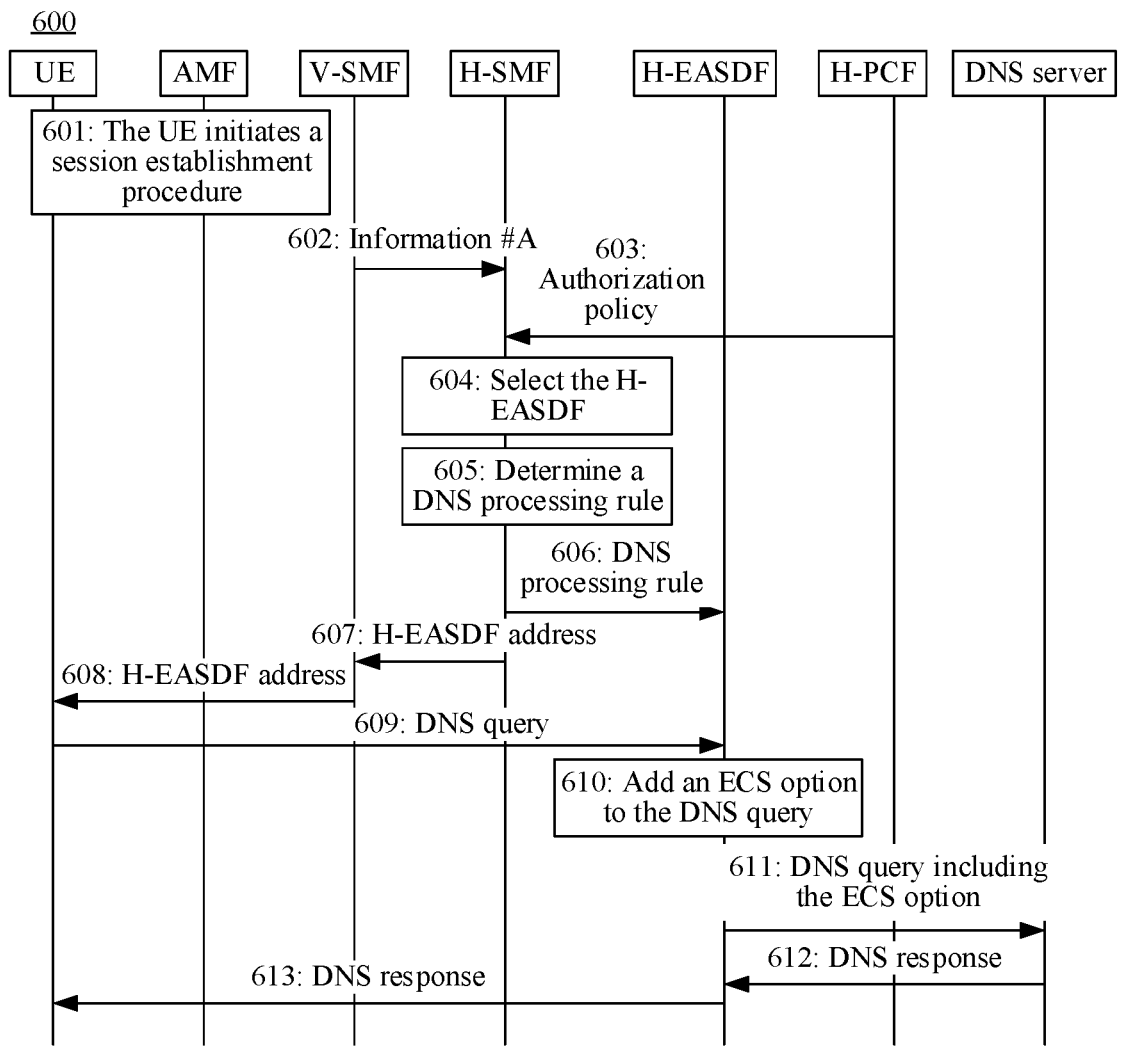
FIG. 6 is a schematic flowchart of another communication method 600 according to an embodiment of this application.

FIG. 6 is a schematic flowchart of another communication method 600 according to an embodiment of this application. The method 600 may be used to implement a solution of the method 300. For example, the method 600 may be applied to a scenario in which an H-SMF passively receives information #A from a V-SMF, and indicates, according to an authorization policy, an H-EASDF to add an ECS option. The method 600 may include the following steps.

601: UE initiates a session establishment procedure.

Step 601 is similar to step 502, and details are not described herein again.

602: The V-SMF sends the information #A to the H-SMF.

In a possible implementation, an HR session establishment procedure is reused. The V-SMF sends an Nsmf_P-DUSession_Create Request message to the H-SMF, where the message includes the information #A, and the information #A may be used to determine the ECS option.

It should be understood that the Nsmf_PDUSession_Create Request message is merely an example for description. This is not limited in this application.

Optionally, the V-SMF sends a target FQDN #3 (or an FQDN range) to the H-SMF, and the target FQDN #3 may include one or more FQDNs. For example, the target FQDN #3 includes an FQDN corresponding to a service that is allowed to be traffic-routed in a VPLMN (or an FQDN corresponding to a service that is allowed to use an ECS option of the VPLMN), or an FQDN corresponding to a service that is expected to be traffic-routed in the VPLMN (or an FQDN corresponding to a service that is expected to use the ECS option of the VPLMN). When an FQDN of a service matches the target FQDN #3, the service is allowed to use the ECS option of the VPLMN.

603: An H-PCF sends the authorization policy to the H-SMF.

The authorization policy indicates whether traffic routing is allowed in the VPLMN (or the authorization policy indicates whether traffic routing is allowed). For the authorization policy, refer to descriptions about the information #B in the method 300. Details are not described herein again.

Optionally, the authorization policy further includes a target FQDN #4 (or an FQDN range), and the target FQDN #4 may include one or more FQDNs. The target FQDN #4 includes an FQDN corresponding to a service that is allowed to be traffic-routed in the VPLMN (or an FQDN corresponding to a service that is allowed to use the ECS option of the VPLMN), and/or an FQDN corresponding to a service that is not allowed to be traffic-routed in the VPLMN (or an FQDN corresponding to a service that is not allowed to use the ECS option of the VPLMN). The following mainly provides descriptions by using an example in which the target FQDN #4 includes the FQDN corresponding to the service that is allowed to be traffic-routed in the VPLMN.

Step 603 is similar to step 506, and details are not described herein again.

It should be noted that the H-SMF may locally configure the authorization policy. In this case, step 603 may not be performed.

604: The H-SMF selects the H-EASDF.

Step 604 is similar to step 507, and details are not described herein again.

605: The H-SMF determines a DNS processing rule.

The H-SMF may determine (or formulate) the DNS processing rule based on the information #A determined in step 602. Specifically, the DNS processing rule may include the information #A determined in step 602, the information #A is used by the H-EASDF to determine the ECS option, and further, the DNS processing rule may be used to add the ECS option to a DNS query.

Optionally, the H-SMF determines the DNS processing rule according to an authorization policy. For example, if the authorization policy indicates that traffic routing is allowed in the VPLMN, the H-SMF may determine the DNS processing rule based on the ECS option. The authorization policy may be the authorization policy received by the H-SMF in step 603, or may be the authorization policy locally configured by the H-SMF. This is not limited in this application.

In a possible case, the authorization policy includes the target FQDN #4, and the H-SMF receives no FQDN #3 in step 602. In this case, in a possible manner, the DNS processing rule may further include the target FQDN #4, and indicates the H-EASDF to detect the DNS query message. When an included FQDN matches the target FQDN #4 in the DNS processing rule, the ECS option is added to the DNS query message.

In another possible case, the authorization policy includes the target FQDN #4, and the H-SMF receives the FQDN #3 in step 602. In this case, in a possible manner, the DNS processing rule may further include the target FQDN #4, and indicates the H-EASDF to detect the DNS query message.

When an included FQDN matches the target FQDN #4 in the DNS processing rule, the ECS option is added to the DNS query message. In another possible manner, the DNS processing rule may further include an intersection set (for example, denoted as a target FQDN #34) of the target FQDN #3 and the target FQDN #4, and indicates the H-EASDF to detect the DNS query message. When an included FQDN matches the target FQDN #34 in the DNS processing rule, the ECS option is added to the DNS query message. In another possible manner, the DNS processing rule may further include the target FQDN #3, and indicates the H-EASDF to detect the DNS query message. When an included FQDN matches the target FQDN #3 in the DNS processing rule, the ECS option is added to the DNS query message.

In another possible case, the authorization policy does not include the target FQDN #4, and the H-SMF receives the FQDN #3 in step 602. In this case, the DNS processing rule may further include the target FQDN #3, and indicates the H-EASDF to detect the DNS query message. When an included FQDN matches the target FQDN #3 in the DNS processing rule, the ECS option is added the DNS query message.

In another possible case, the authorization policy does not include the target FQDN #4, and the H-SMF receives no FQDN #3 in step 602. In this case, the DNS processing rule indicates to add the ECS option to a DNS query message of an FQDN range of a service that is not deployed at an HPLMN edge.

It may be understood that the foregoing examples are examples for description. For details, refer to the cases 1 to 4 in the method 300. Details are not described herein again.

606: The H-SMF sends the DNS processing rule to the H-EASDF.

607: The H-SMF sends an H-EASDF address to the V-SMF.

In a possible implementation, the HR session establishment procedure is reused, and the H-SMF sends an Nsmf interface PDU session establishment response (Nsmf_PDUSession_Create Response) message to the V-SMF, where the message includes the H-EASDF address.

It should be understood that the Nsmf_PDUSession_Create Response message is merely an example for description. This is not limited in this application.

608: The V-SMF sends the H-EASDF address to the UE.

In a possible implementation, the V-SMF sends a V-EASDF address to the UE via an AMF. For example, the V-SMF sends an N1 message to the UE via the AMF, where the N1 message includes an N1 SM container, and the N1 SM container carries the H-EASDF address. For example, the V-SMF sends the H-EASDF address to the AMF by using an Namf_Communication_N1N2MessageTransfer message, and then the AMF sends the H-EASDF address to the UE by using a NAS message.

609: The UE sends the DNS query to the H-EASDF.

610: The H-EASDF adds the ECS option to the DNS query.

611: The H-EASDF sends, to a DNS server, a DNS query including the ECS option.

612: The DNS server sends a DNS response to the H-EASDF.

613: The H-EASDF sends the DNS response to the UE.

Steps 609 to 613 are similar to steps 511 to 515, and details are not described herein again.

According to the method 600, the V-SMF sends the information #A to the H-SMF, and the H-SMF passively receives the information #A from the V-SMF, and indicates, according to the authorization policy, the H-EASDF to add the ECS option to the DNS query and receive an address of a local EAS from the DNS server, so that the local EAS is discovered.

Figure 7:
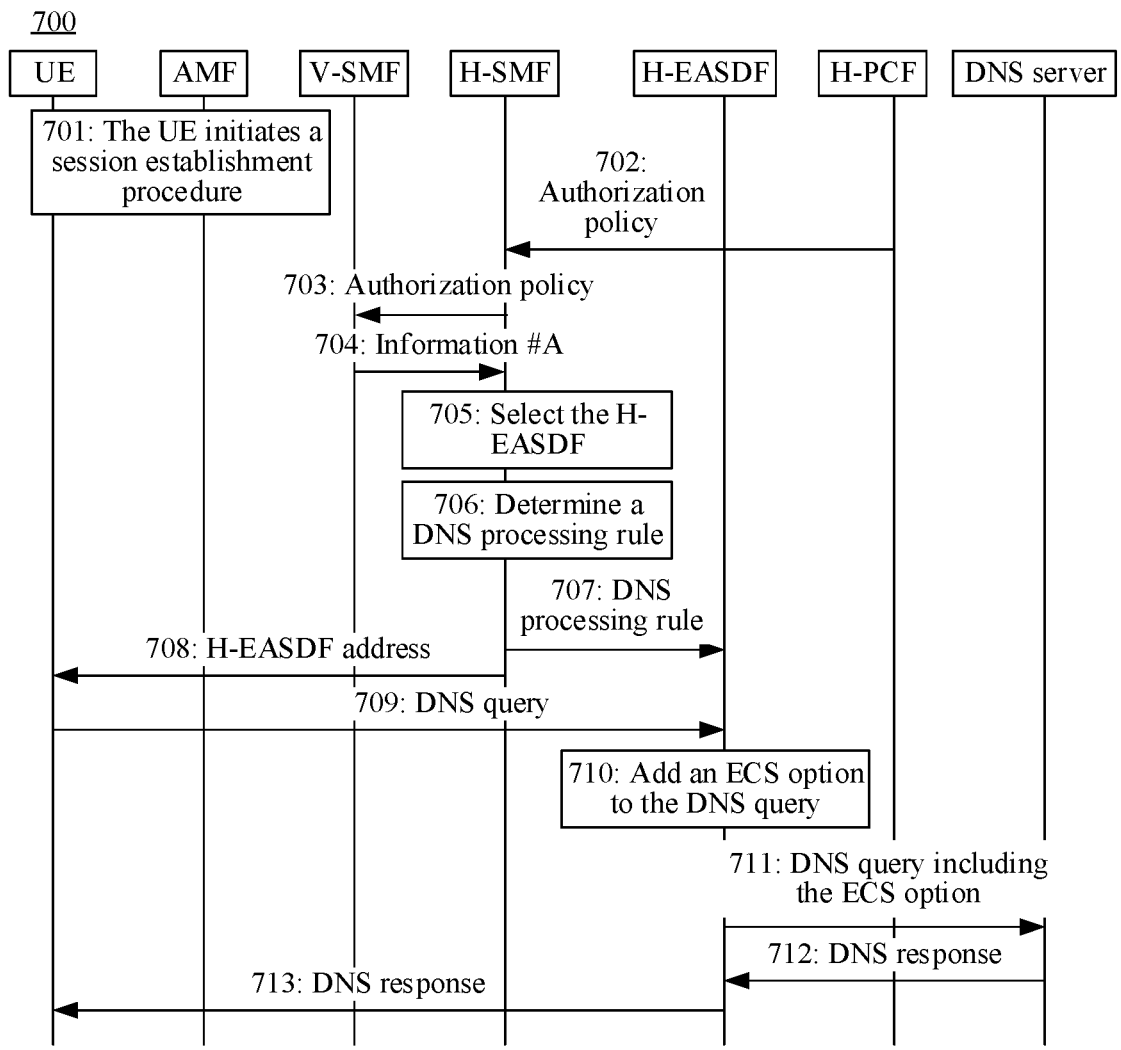
FIG. 7 is a schematic flowchart of another communication method 700 according to an embodiment of this application.

FIG. 7 is a schematic flowchart of another communication method 700 according to an embodiment of this application. The method 700 may be used to implement a solution of the method 300. For example, the method 700 may be applied to a scenario in which an H-SMF actively requests the foregoing information #A from a V-SMF, and indicates, according to an authorization policy, an H-EASDF to add an ECS option to a DNS query. The method 700 may include the following steps.

701: UE initiates a session establishment procedure.

Step 701 is similar to step 502, and details are not described herein again.

702: An H-PCF sends the authorization policy to the H-SMF.

The authorization policy indicates whether traffic routing is allowed in a VPLMN (or the authorization policy indicates whether traffic routing is allowed). For the authorization policy, refer to descriptions about the information #B in the method 300. Details are not described herein again.

Step 702 is similar to step 506, and details are not described herein again.

703: The H-SMF sends the authorization policy to the V-SMF.

In a possible implementation, an HR session establishment procedure is reused. For example, the H-SMF receives a session establishment request message from the V-SMF, sends a session establishment response message to the V-SMF, and includes the authorization policy in the session establishment response message. It may be understood that the authorization policy may be received from the H-PCF in step 702, or may be locally configured.

Optionally, the authorization policy includes a target FQDN #5 (or an FQDN range), and the target FQDN #5 may include one or more FQDNs. The target FQDN #5 includes an FQDN corresponding to a service that is allowed to be traffic-routed in the VPLMN (or an FQDN corresponding to a service that is allowed to use an ECS option of the VPLMN), and/or an FQDN corresponding to a service that is not allowed to be traffic-routed in the VPLMN (or an FQDN corresponding to a service that is not allowed to use the ECS option of the VPLMN). For example, if the authorization policy received by the H-SMF from the H-PCF in step 702 or the authorization policy locally configured by the H-SMF includes the target FQDN #5, in step 703, the authorization policy sent by the H-SMF to the V-SMF may include the target FQDN #5.

In a first possible case, the authorization policy may further indicate to obtain the information #A. The information #A may be used to determine the ECS option.

In a second possible case, the authorization policy includes request information #1. The request information #1 is used to request the information #A, and the information #A may be used to determine the ECS option.

In a third possible case, the H-SMF sends request information #1 to the V-SMF. The request information #1 is used to request the information #A, and the information #A may be used to determine the ECS option.

704: The V-SMF sends the information #A to the H-SMF.

In a possible implementation, the first possible case in step 703 is used as an example. After receiving the authorization policy, the V-SMF learns, according to the authorization policy, that traffic routing is allowed in the VPLMN. In this case, the V-SMF sends the information #A to the H-SMF in response to the authorization policy, where the information #A may be used to determine the ECS option.

In another possible implementation, the second possible case in step 703 is used as an example. After receiving the authorization policy, the V-SMF learns, according to the authorization policy, that traffic routing is allowed in the VPLMN. In this case, the V-SMF sends the information #A to the H-SMF in response to the request information #1 in the authorization policy, where the information #A may be used to determine the ECS option.

In another possible implementation, the third possible case in step 703 is used as an example. After receiving the authorization policy and the request information #1, the V-SMF learns, according to the authorization policy, that traffic routing is allowed in the VPLMN. In this case, the V-SMF sends the information #A to the H-SMF in response to the request information #1. where the information #A may be used to determine the ECS option.

In another possible implementation, the V-SMF may send the information #A to the H-SMF based on internal logic, a local configuration, or the like of the V-SMF, where the information #A may be used to determine the ECS option.

It may be understood that the foregoing several implementations are examples for description, and this application is not limited thereto.

Optionally, the V-SMF sends a target FQDN #6 (or an FQDN range) to the H-SMF, and the target FQDN #6 may include one or more FQDNs. For example, the target FQDN #6 includes an FQDN corresponding to a service that is allowed to be traffic-routed in the VPLMN (or an FQDN corresponding to a service that is allowed to use the ECS option of the VPLMN), or an FQDN expected to be traffic-routed in the VPLMN (or an FQDN corresponding to a service that is expected to use the ECS option of the VPLMN). When an FQDN of a service matches the target FQDN #6, the service is allowed to use the ECS option of the VPLMN.

For example, if the authorization policy in step 703 includes the target FQDN #5, the V-SMF may consider the target FQDN #5 included in the authorization policy when determining the target FQDN #6 expected (or allowed) to be traffic-routed in the VPLMN.

705: The H-SMF selects the H-EASDF.
706: The H-SMF determines a DNS processing rule.
707: The H-SMF sends the DNS processing rule to the H-EASDF.

Steps 705 to 707 are similar to steps 604 to 606, and details are not described herein again.

708: The H-SMF sends an H-EASDF address to the UE.
709: The UE sends the DNS query to the H-EASDF.
710: The H-EASDF adds the ECS option to the DNS query.
711: The H-EASDF sends, to a DNS server, a DNS query including the ECS option.
712: The DNS server sends a DNS response to the H-EASDF.
713: The H-EASDF sends the DNS response to the UE.

Steps 708 to 713 are similar to steps 510 to 515, and details are not described herein again.

According to the method 700, the H-SMF actively requests the information #A from the V-SMF, and indicates, according to the authorization policy, the H-EASDF to add the ECS option, so that a local EAS is discovered.

Figure 8:
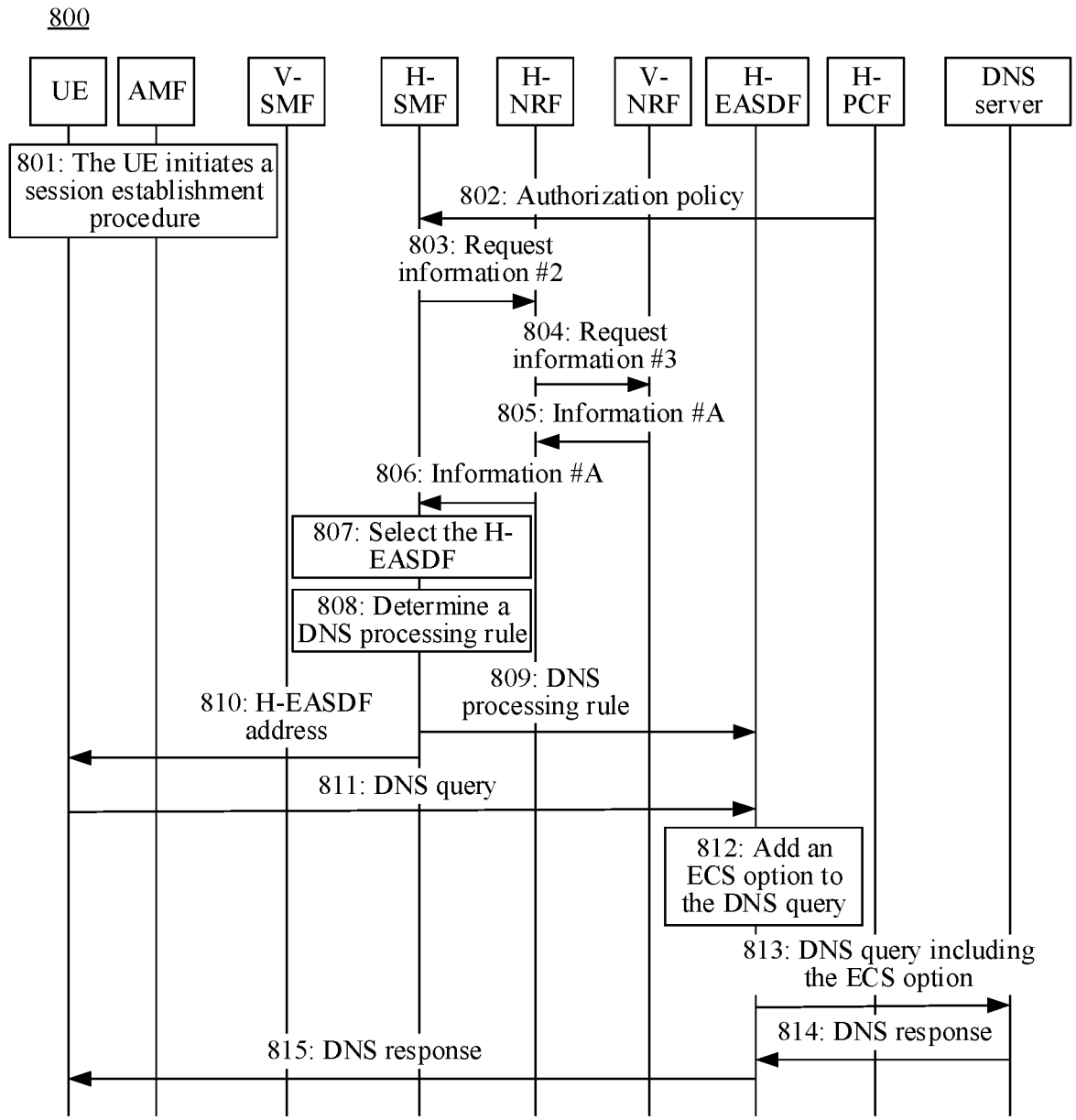
FIG. 8 is a schematic flowchart of another communication method 800 according to an embodiment of this application.

FIG. 8 is a schematic flowchart of another communication method 800 according to an embodiment of this application. The method 800 may be used to implement a solution of the method 300. For example, the method 800 may be applied to a scenario in which an H-SMF requests the foregoing information #A from an H-NRF, and indicates, according to an authorization policy, an H-EASDF to add an ECS option to a DNS query. The method 800 may include the following steps.

801: UE initiates a session establishment procedure.

Step 801 is similar to step 502, and details are not described herein again.

802: An H-PCF sends the authorization policy to the H-SMF.

The authorization policy indicates whether traffic routing is allowed in a VPLMN (or the authorization policy indicates whether traffic routing is allowed). For the authorization policy, refer to descriptions about the information #B in the method 300. Details are not described herein again.

Step 802 is similar to step 506, and details are not described herein again.

803: The H-SMF sends request information #2 to the H-NRF.

The request information #2 is used to request (or is used to obtain) the information #A. Optionally, the request information #2 includes a VPLMN ID. A form of the request information #2 is not limited in this application. For example, the request information #2 may be implemented by using one or more bits. The information #A is requested by using a field of the one or more bits. For an implementation of the request information #2, refer to descriptions in the method 300. Details are not described herein again.

In a possible implementation, the H-SMF sends an Nnrf_NFManagement_NFStatus Subscribe message to the H-NRF, where the message carries the request information #2.

In a first possible case, after receiving the request information #2, the H-NRF may determine the information #A based on a local configuration. In this case, the H-NRF directly sends a response of the request information #2 to the H-SMF, where the response carries the information #A. That is, steps 804 and 805 may not be performed.

In a second possible case, after receiving the request information #2, the H-NRF may receive the information #A from a V-NRF. In this case, the method 800 may include steps 804 and 805.

804: The H-NRF sends request information #3 to the V-NRF.

The request information #3 is used to request (or is used to obtain) the information #A. Optionally, the request information #3 includes the VPLMN ID. A form of the request information #3 is not limited in this application. For example, the request information #3 may be implemented by using one or more bits. The information #A is requested by using a field of the one or more bits.

In a possible implementation, the H-NRF sends an Nnrf_NFManagement_NFStatus Subscribe message to the V-NRF, where the message carries the request information #3.

805: The V-NRF sends the information #A to the H-NRF.

The V-NRF determines the information #A and sends the information #A to the H-NRF based on the request information #3 received from the H-NRF. In a possible implementation, the V-NRF sends an Nnrf_NFManagement_NFStatus Notify message to the H-NRF, where the message carries the information #A.

806: The H-NRF sends the information #A to the H-SMF.

In a possible implementation, the H-NRF sends the Nnrf_NFManagement_NFStatus Notify message to the H-SMF, where the message includes the information #A.

In a first possible case, if the H-NRF determines the information #A based on the local configuration in step 803, the information #A sent by the H-NRF to the H-SMF in step 806 may be the information #A determined by the H-NRF based on the local configuration in step 803.

In a second possible case, if steps 804 and 805 are performed, the information #A sent by the H-NRF to the H-SMF in step 806 may be the information #A received by the H-NRF from the V-NRF in step 805.

In a third possible case, if the H-NRF is locally configured with the information #A in step 803, and steps 804 and 805 are performed, that is, the H-NRF receives the information #A from the V-NRF, the information #A sent by the H-NRF to the H-SMF in step 806 may be locally configured or received. For example, in this case, the information #A sent by the H-NRF to the H-SMF in step 806 may be the information #A received by the H-NRF from the V-NRF.

807: The H-SMF selects the H-EASDF.

808: The H-SMF determines a DNS processing rule.

809: The H-SMF sends the DNS processing rule to the H-EASDF.

810: The H-SMF sends an H-EASDF address to the UE.

811: The UE sends the DNS query to the H-EASDF.

812: The H-EASDF adds the ECS option to the DNS query.

813: The H-EASDF sends, to a DNS server, a DNS query including the ECS option.

814: The DNS server sends a DNS response to the H-EASDF.

815: The H-EASDF sends the DNS response to the UE.

Steps 807 to 815 are similar to steps 705 to 713, and details are not described herein again.

According to the method 800, the H-SMF requests the information #A from the H-NRF, and indicates, according to the authorization policy, the H-EASDF to add the ECS option, so that a local EAS is discovered.

Figure 9:
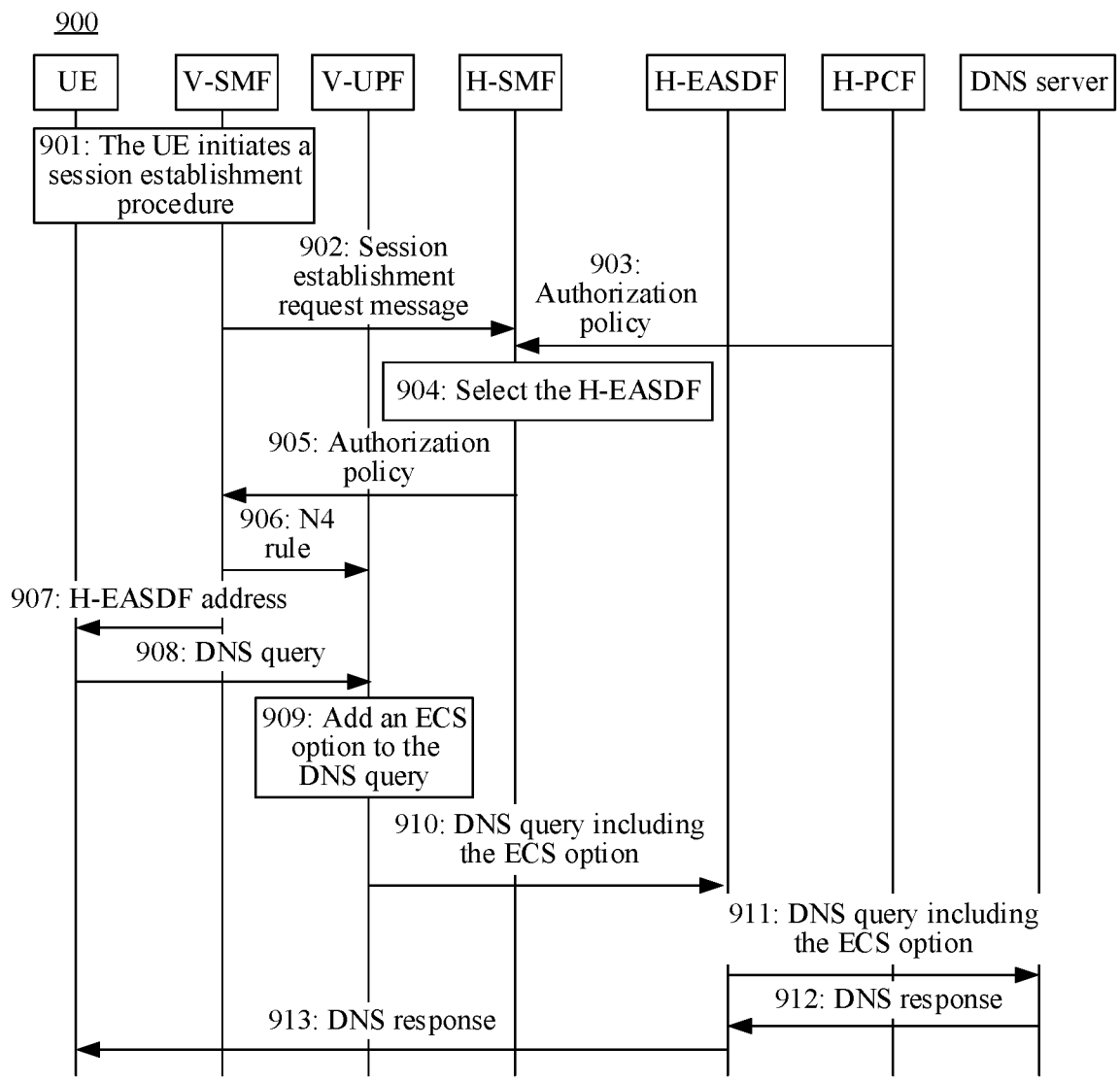
FIG. 9 is a schematic flowchart of another communication method 900 according to an embodiment of this application.

FIG. 9 is a schematic flowchart of another communication method 900 according to an embodiment of this application. The method 900 may be used to implement a solution of the method 400. For example, the method 900 may be applied to a scenario in which a V-SMF obtains an authorization policy from an H-SMF and an ECS option is inserted. The method 900 may include the following steps.

901: UE initiates a session establishment procedure.

Step 901 is similar to step 502, and details are not described herein again.

902: The V-SMF sends a session establishment request message to the H-SMF.

In a possible implementation, an HR session establishment procedure is reused, and the V-SMF sends an Nsmf_PDUSession_Create Request message to the H-SMF.

Optionally, the session establishment request message includes a target FQDN #7 (or an FQDN range). The target FQDN #7 may include one or more FQDNs corresponding to services that are allowed to be traffic-routed in a VPLMN (or FQDNs corresponding to services that are allowed to use an ECS option of the VPLMN), or FQDNs corresponding to services that are expected to be traffic-routed in the VPLMN (or FQDNs corresponding to services that are expected to use the ECS option of the VPLMN). For example, the target FQDN #7 includes the one or more FQDNs corresponding to the services that are allowed to be traffic-routed in the VPLMN. When an FQDN of a service matches the target FQDN #7, the service is allowed to use the ECS option of the VPLMN.

903: An H-PCF sends the authorization policy to the H-SMF.

The authorization policy indicates whether traffic routing is allowed in the VPLMN (or the authorization policy indicates whether traffic routing is allowed). For the authorization policy, refer to descriptions about the information #B in the method 300. Details are not described herein again.

Optionally, the authorization policy further includes a target FQDN #8 (or an FQDN range), and the target FQDN #8 may include one or more FQDNs. The target FQDN #8 includes an FQDN corresponding to a service that is allowed to be traffic-routed in the VPLMN (or an FQDN corresponding to a service that is allowed to use the ECS option of the VPLMN), and/or an FQDN corresponding to a service that is not allowed to be traffic-routed in the VPLMN (or an FQDN corresponding to a service that is not allowed to use the ECS option of the VPLMN). The following mainly provides descriptions by using an example in which the target FQDN #8 includes the FQDN corresponding to the service that is allowed to use the ECS option of the VPLMN.

904: The H-SMF selects an H-EASDF.

Steps 903 and 904 are similar to steps 603 and 604, and details are not described herein again.

905: The H-SMF sends the authorization policy to the V-SMF.

For example, after receiving the session establishment request message from the V-SMF, the H-SMF sends a session establishment response message to the V-SMF, and includes, in the session establishment response message, the authorization policy received in step 903. Optionally, the session establishment response message may further include an H-EASDF address.

In a possible implementation, the HR session establishment procedure is reused, and the H-SMF sends an Nsmf_PDUSession_Create Response message to the V-SMF, where the message includes the H-EASDF address and the authorization policy.

906: The V-SMF sends an N4 rule to a V-UPF.

The N4 rule indicates the V-UPF to add the ECS option to a DNS query.

The V-SMF may determine, according to the authorization policy received in step 905, to send the N4 rule to the V-UPF. Specifically, if the V-SMF learns, according to the authorization policy received in step 905, that traffic routing is allowed in the VPLMN, the V-SMF sends the N4 rule to the V-UPF.

Optionally, if the authorization policy includes the target FQDN #8, the N4 rule indicates the V-UPF to add the ECS option to a DNS query that includes an FQDN matching the target FQDN #8 included in the authorization policy.

In a possible implementation, the V-SMF sends an N4 session create request message to the V-UPF, where the message carries the N4 rule. Correspondingly, the V-UPF may send an N4 session create response message to the V-SMF.

907: The V-SMF sends the H-EASDF address to the UE.

In a possible implementation, the V-SMF sends a V-EASDF address to the UE via an AMF. For example, the V-SMF sends an N1 message to the UE via the AMF, where the N1 message includes an N1 SM container, and the N1 SM container carries the H-EASDF address. For example, the V-SMF sends the H-EASDF address to the AMF by using an Namf_Communication_N1N2MessageTransfer message, and then the AMF sends the H-EASDF address to the UE by using a NAS message.

908: The UE sends the DNS query to the V-UPF.

For example, the UE sends the DNS query message to the V-UPF through a user plane via a RAN.

909: The V-UPF adds the ECS option to the DNS query.

The V-UPF adds the ECS option to the DNS query according to the N4 rule received in step 906.

Optionally, if the N4 rule received in step 906 includes the target FQDN #8, after receiving the DNS query, the V-UPF may detect the DNS query. For example, when the V-UPF receives the DNS query, if the FQDN included in the DNS query matches the target FQDN #8 in the N4 rule, the V-UPF adds the ECS option to the DNS query.

It should be noted that the ECS option may be added to the DNS query, may be added to a GTP-U header of a UP packet, or may be added in another manner. This is not limited in this application. This application mainly provides descriptions by using an example in which the ECS option is added to the DNS query.

It may be understood that, in step 909, the V-UPF actually processes a DNS message. This is equivalent to performing a function of a V-EASDF. Therefore, the V-UPF herein may be understood as a UPF having a function of processing the DNS message, or may be understood as the UPF and the EASDF that are jointly deployed. It should be understood that a specific network element for performing the function is not limited in this application, and any network element that can implement the function is applicable to embodiments of this application.

910: The V-UPF sends, to the H-EASDF, a DNS query including the ECS option.

After adding the ECS option to the DNS query; the V-UPF sends the DNS query message (the DNS query to which the ECS option has been added) to the H-EASDF through the user plane.

911: The H-EASDF sends, to a DNS server, the DNS query including the ECS option.

912: The DNS server sends a DNS response to the H-EASDF.

913: The H-EASDF sends the DNS response to the UE.

Steps 911 to 913 are similar to steps 513 to 515, and details are not described herein again.

According to the method 900, the V-SMF obtains the authorization policy from the H-SMF, and the V-UPF inserts the ECS option into the DNS query, so that the EASDF receives an address of a local EAS from the DNS server, and the local EAS in an HR roaming scenario is discovered.

Figure 10:
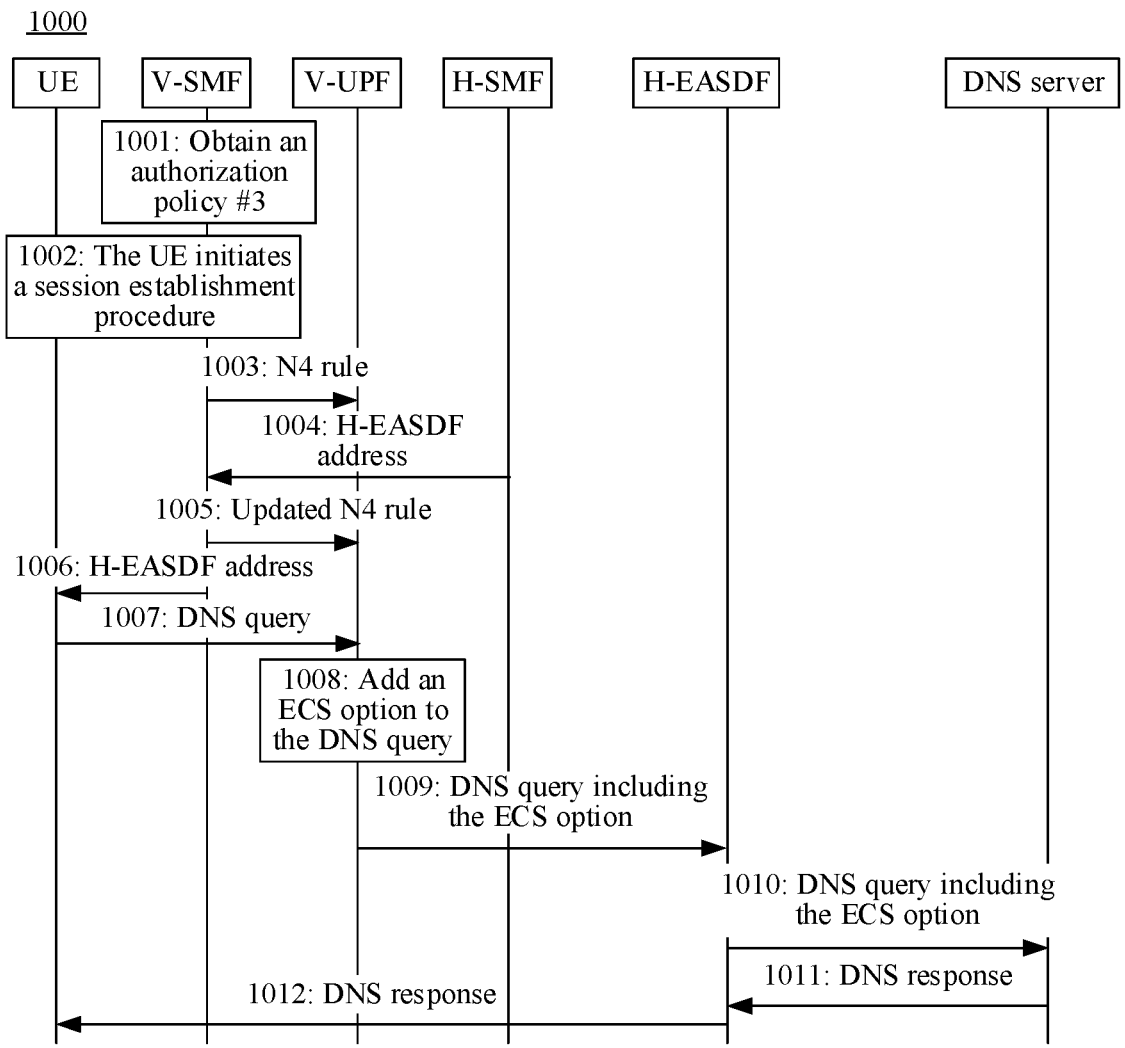
FIG. 10 is a schematic flowchart of another communication method 1000 according to an embodiment of this application.

FIG. 10 is a schematic flowchart of another communication method 1000 according to an embodiment of this application. The method 1000 may be used to implement a solution of the method 400. For example, the method 1000 may be applied to a scenario in which a V-SMF indicates, based on a local configuration, a V-UPF to insert an ECS option into a DNS query. The method 1000 may include the following steps.

1001: The V-SMF obtains an authorization policy #3.

The authorization policy #3 indicates whether traffic routing is allowed in a VPLMN (or the authorization policy #3 indicates whether traffic routing is allowed). For the authorization policy #3, refer to descriptions about the information #B in the method 300. Details are not described herein again.

In a possible manner, the V-SMF locally configures the authorization policy #3.

In another possible manner, the V-SMF receives the authorization policy #3. For example, after a device is powered on, the authorization policy #3 is received from an H-SMF by using another procedure (for example, a session establishment procedure).

For a manner in which the V-SMF obtains the authorization policy #3, refer to the manner in which the second session management network element obtains the information #B in the method 400. Details are not described herein again.

Optionally, the V-SMF may further obtain a correspondence #A, where the correspondence #A indicates a correspondence between the VPLMN and information #A. For example, the authorization policy #3 includes the correspondence #A.

Optionally, the authorization policy #3 further includes a target FQDN #9 (or an FQDN range), and the target FQDN #9 may include one or more FQDNs. The target FQDN #9 includes an FQDN corresponding to a service that is allowed to be traffic-routed in the VPLMN (or an FQDN corresponding to a service that is allowed to use an ECS option of the VPLMN), and/or an FQDN corresponding to a service that is not allowed to be traffic-routed in the VPLMN (or an FQDN corresponding to a service that is not allowed to use the ECS option of the VPLMN). For example, the target FQDN #9 includes the FQDN corresponding to the service that is allowed to be traffic-routed in the VPLMN. When an FQDN of a service matches the target FQDN #9, the service is allowed to use the ECS option of the VPLMN.

1002: UE initiates a session establishment procedure.

Step 1002 is similar to step 502, and details are not described herein again.

1003: The V-SMF sends an N4 rule to the V-UPF.

The N4 rule indicates the V-UPF to add the ECS option to the DNS query.

The V-SMF may determine, according to the authorization policy #3 obtained in step 1001, to send the N4 rule to the V-UPF. Specifically, if the V-SMF learns, according to the authorization policy #3 obtained in step 1001, that traffic routing is allowed in the VPLMN, the V-SMF sends the N4 rule to the V-UPF.

If a configuration structure of the authorization policy #3 in the V-SMF is in a form of a {PLMN ID-authorization policy} set as shown in Table 1, the V-SMF may determine an HPLMN ID based on an H-SMF ID, and further obtain, based on Table 1, the authorization policy #3 corresponding to an HPLMN. The H-SMF ID may be sent by an AMF to the V-SMF. For example, an HR session establishment procedure is reused. The AMF sends an Nsmf_PDUSession-_CreateSMContext Request message to the V-SMF, where the message carries the H-SMF ID.

Optionally, if the authorization policy #3 includes the target FQDN #9, the N4 rule indicates the V-UPF to add the ECS option to a DNS query that includes an FQDN matching the target FQDN #9) included in the authorization policy #3.

In a possible implementation, the V-SMF sends an N4 session create request message to the V-UPF, where the message carries the N4 rule. Correspondingly, the V-UPF may send an N4 session create response message to the V-SMF.

1004: The H-SMF sends an H-EASDF address to the V-SMF.

In a possible implementation, the HR session establishment procedure is reused, and the H-SMF sends an Nsmf_P-DUSession_Create Response message to the V-SMF, where the message includes the H-EASDF address.

Optionally, the message may further include an authorization policy (denoted as an authorization policy #4 for differentiation), and the authorization policy #4 indicates whether traffic routing is allowed in the VPLMN (or whether traffic routing is allowed). Further, the authorization policy #4 may include a target FQDN #10.

1005: The V-SMF sends an updated N4 rule to the V-UPF.

If the V-SMF receives the authorization policy #4 in step 1004, the V-SMF may send the updated N4 rule to the V-UPF. For example, the V-SMF sends an N4 session create request message to the V-UPF, where the N4 session create request message includes the updated N4 rule.

In a possible case, the authorization policy #4 indicates that traffic routing is not allowed in the VPLMN. In this case, the V-SMF sends the updated N4 rule to the V-UPF, where the updated N4 rule indicates the V-UPF to delete an indication of adding the ECS option to the DNS query in the previous N4 rule, or the updated N4 rule indicates, to the V-UPF, that the indication of adding the ECS option to the DNS query in the previous N4 rule is invalid.

In another possible case, the authorization policy #4 indicates that traffic routing is allowed in the VPLMN. The following provides descriptions with reference to several cases.

Case A: The authorization policy #4 includes the target FQDN #10, and the V-SMF obtains the target FQDN #9 in step 1001.

In this case, for example, the V-SMF sends the updated N4 rule to the V-UPF. The updated N4 rule indicates the V-UPF to add the ECS option to the target FQDN #10. For another example, the V-SMF sends the updated N4 rule to the V-UPF. The updated N4 rule indicates the V-UPF to add the ECS option to a target FQDN #11. The target FQDN #11 is an intersection set of the target FQDN #9 and the target FQDN #10, or the target FQDN #11 is a union set of the target FQDN #9 and the target FQDN #10.

Case B: The authorization policy #4 includes the target FQDN #10, and the V-SMF does not obtain the target FQDN #9 in step 1001.

In this case, for example, the V-SMF sends the updated N4 rule to the V-UPF. The updated N4 rule indicates the V-UPF to add the ECS option to the target FQDN #10.

Case C: The authorization policy #4 does not include the target FQDN #10.

In this case, the V-SMF may not need to send the updated N4 rule to the V-UPF.

It may be understood that the foregoing several cases are examples for description, and this application is not limited thereto.

1006: The V-SMF sends the H-EASDF address to the UE.
1007: The UE sends the DNS query to the V-UPF.
1008: The V-UPF adds the ECS option to the DNS query.
1009: The V-UPF sends, to the H-EASDF, a DNS query including the ECS option.
1010: The H-EASDF sends, to a DNS server, the DNS query including the ECS option.
1011: The DNS server sends a DNS response to the H-EASDF.
1012: The H-EASDF sends the DNS response to the UE.

Steps 1006 to 1012 are similar to steps 907 to 913, and details are not described herein again.

According to the method 1000, the V-SMF indicates, based on the local configuration, the V-UPF to insert the ECS option into the DNS query, so that an address of a local EAS is received from the DNS server, and the local EAS in an HR roaming scenario is discovered.

Figure 11:
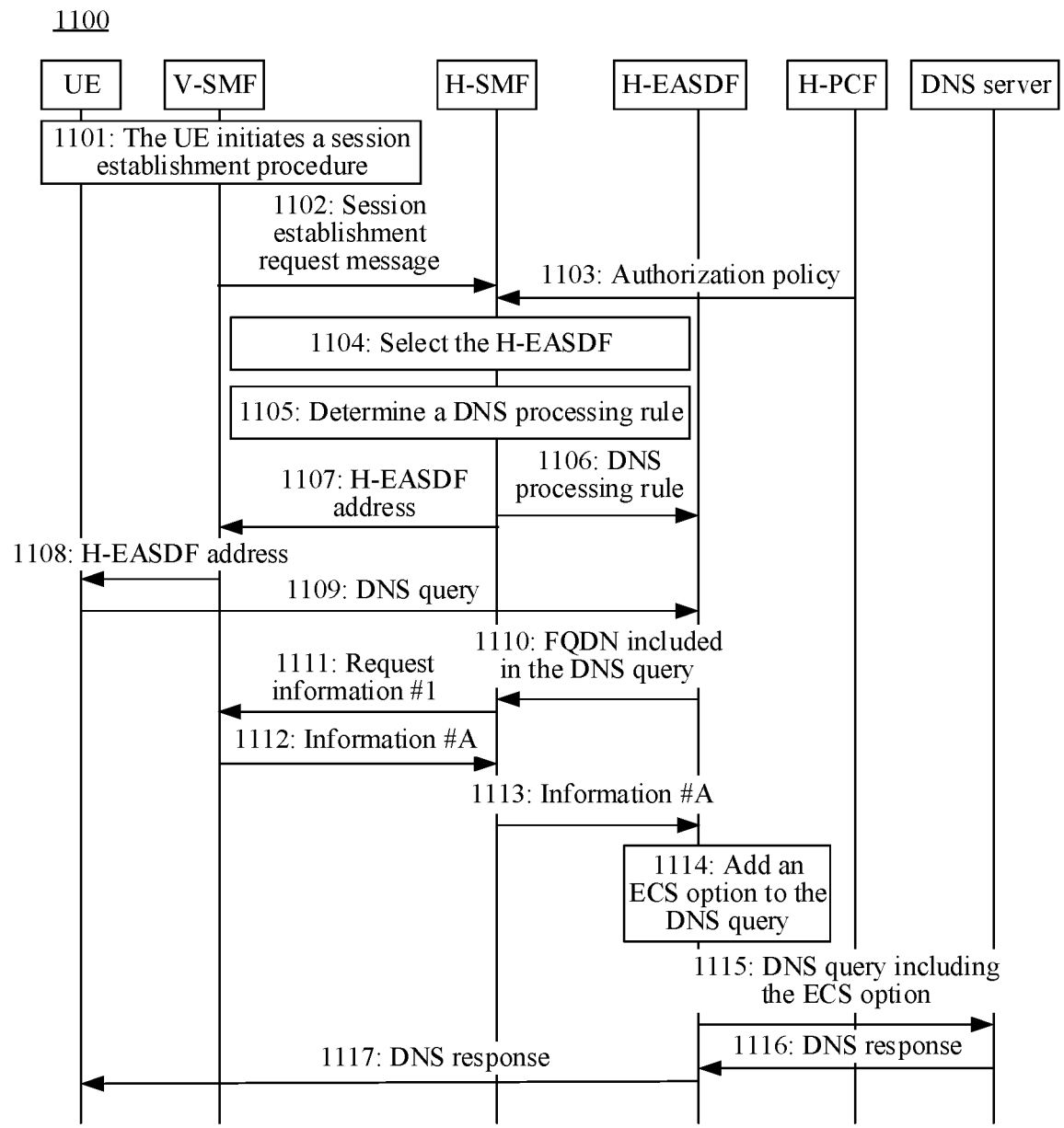
FIG. 11 is a schematic flowchart of another communication method 1100 according to an embodiment of this application.

FIG. 11 is a schematic flowchart of another communication method 1100 according to an embodiment of this application. The method 1100 may be used by an H-SMF to receive an authorization policy, indicate an EASDF to report a DNS query, and indicate the EASDF to add an ECS option. The method 1100 may include the following steps.

1101: UE initiates a session establishment procedure.

Step 1101 is similar to step 502, and details are not described herein again.

1102: A V-SMF sends a session establishment request message to the H-SMF.

In a possible implementation, an HR session establishment procedure is reused, and the V-SMF sends an Nsmf_PDUSession_Create Request message to the H-SMF.

Optionally, the session establishment request message includes a target FQDN #12 (or an FQDN range), and the target FQDN #12 may include one or more FQDNs. For example, the target FQDN #12 includes an FQDN corresponding to a service that is allowed to be traffic-routed in a VPLMN (or an FQDN corresponding to a service that is allowed to use an ECS option of the VPLMN), or an FQDN corresponding to a service that is expected to be traffic-routed in the VPLMN (or an FQDN corresponding to a service that is expected to use the ECS option of the VPLMN). When an FQDN of a service matches the target FQDN #12, the service is allowed to use the ECS option of the VPLMN.

Optionally, the session establishment request message includes information #A.

1103: An H-PCF sends the authorization policy to the H-SMF.
1104: The H-SMF selects an H-EASDF.
1105: The H-SMF determines a DNS processing rule.
1106: The H-SMF sends the DNS processing rule to the H-EASDF.

Steps 1103 to 1106 are similar to steps 603 to 606. A difference lies in that the DNS processing rule in steps 1105 and 1106 may further indicate the H-EASDF to report, to the H-SMF, a received DNS query or an FQDN included in the DNS query. Specifically, if the DNS processing rule includes an FQDN (for example, the target FQDN #12), the H-EASDF is indicated to report, to the H-SMF, a received DNS query that matches the target FQDN #12 or an FQDN included in the DNS query.

1107: The H-SMF sends an H-EASDF address to the V-SMF.
1108: The V-SMF sends the H-EASDF address to the UE.

Steps 1107 and 1108 are similar to steps 607 and 608, and details are not described herein again.

It may be understood that, a time sequence or a logical relationship of performing steps 1104 to 1106 and steps 1107 and 1108 is not limited, provided that steps 1104 to 1106 and steps 1107 and 1108 are performed before step 1109.

1109: The UE sends the DNS query to the H-EASDF.

For example, the UE sends the DNS query message to the H-EASDF through a user plane via a RAN and a UPF.

1110: The H-EASDF reports, to the H-SMF, the FQDN included in the DNS query.

After receiving the DNS query, the H-EASDF reports, to the H-SMF according to the DNS processing rule received in step 1106, the FQDN included in the DNS query.

If the DNS processing rule includes the FQDN (for example, the target FQDN #12), the FQDN included in the DNS query may match the FQDN in the DNS processing rule. It is assumed that the FQDN included in the DNS query message matches the FQDN in the DNS processing rule.

1111: The H-SMF sends request information #1 to the V-SMF.

The request information #1 is used to request the information #A.

After receiving the FQDN reported by the EASDF, the H-SMF requests the information #A from the V-SMF. The request information #1 may include the FQDN received by the H-SMF in step 1110.

1112: The V-SMF sends the information #A to the H-SMF.

The V-SMF determines the information #A and returns the information #A to the H-SMF based on a UE location and the reported FQDN.

Sending of the information #A may be triggered by the request information #1, or may be triggered through logic or a local configuration of the V-SMF. This is not limited in this application.

1113: The H-SMF sends the information #A to the H-EASDF.

The H-SMF sends the received information #A to the H-EASDF.

It should be noted that, if the information #A is included in step 1102, steps 1110 to 1113 may be omitted.

1114: The H-EASDF adds the ECS option to the DNS query.

1115: The H-EASDF sends, to a DNS server, a DNS query including the ECS option.

1116: The DNS server sends a DNS response to the H-EASDF.

1117: The H-EASDF sends the DNS response to the UE.

Steps 1114 to 1117 are similar to steps 512 to 515, and details are not described herein again.

According to the method 1100, the H-SMF indicates the EASDF to report the DNS query, obtains the information #A from the V-SMF, and indicates the EASDF to add the ECS option and receive an address of a local EAS from the DNS server, so that the local EAS in an HR roaming scenario is discovered.

It may be understood that the examples in FIG. 5 to FIG. 11 in embodiments of this application are merely intended to help a person skilled in the art understand embodiments of this application, and are not intended to limit embodiments of this application to the scenarios shown in the examples. It is clear that a person skilled in the art can make various equivalent modifications or changes based on the examples shown in FIG. 5 to FIG. 11, and such modifications or changes also fall within the scope of embodiments of this application. For example, the session establishment procedure in FIG. 5 to FIG. 11 may alternatively be replaced with a session modification procedure. For another example, the ECS option in FIG. 5 to FIG. 11 may alternatively be replaced with an L-DNS server address. Correspondingly, the action of adding the ECS option to the DNS query may alternatively be replaced with an action of forwarding the DNS query to an L-DNS server.

It may be further understood that in some of the foregoing embodiments, message names such as the Nsmf_PDUSession_Update Request message and Nsmf_PDUSession_Context Request are merely examples, and do not limit the protection scope of embodiments of this application.

It may be further understood that some optional features in embodiments of this application may be independent of other features in some scenarios, or may be combined with other features in some scenarios. This is not limited in this application.

It may be further understood that the solutions in embodiments of this application may be appropriately combined for use, and explanations or descriptions of terms in the embodiments may be mutually referenced or explained in the embodiments. This is not limited, It may be further understood that various numeric sequence numbers in embodiments of this application do not mean execution sequences, but are merely for differentiation for ease of description, and therefore should not constitute any limitation on an implementation process of embodiments of this application.

It may be further understood that in the foregoing method embodiments, the method and an operation that are implemented by the device may also be implemented by a component (for example, a chip or a circuit) that can be used in the device.

Corresponding to the methods provided in the foregoing method embodiments, an embodiment of this application further provides a corresponding apparatus. The apparatus includes a corresponding module configured to perform the foregoing method embodiments. The module may be software, hardware, or a combination of software and hardware. It may be understood that technical features described in the foregoing method embodiments are also applicable to the following apparatus embodiments.

Figure 12:
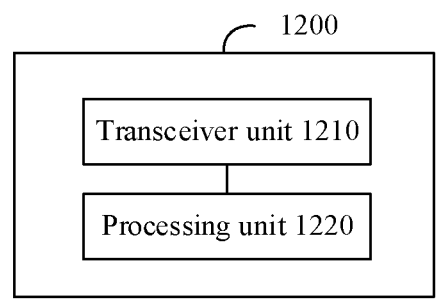
FIG. 12 is a schematic block diagram of a communication apparatus 1200 according to an embodiment of this application.

FIG. 12 is a schematic block diagram of a communication apparatus according to an embodiment of this application. The apparatus 1200 includes a transceiver unit 1210 and a processing unit 1220. The transceiver unit 1210 may be configured to implement a corresponding communication function. The transceiver unit 1210 may also be referred to as a communication interface or a communication unit. The processing unit 1220 may be configured to implement a corresponding processing function, for example, determining a traffic routing point.

Optionally, the apparatus 1200 further includes a storage unit. The storage unit may be configured to store instructions and/or data. The processing unit 1220 may read the instructions and/or the data in the storage unit, so that the apparatus implements an action of the device or the network element in the foregoing method embodiments.

In a first design, the apparatus 1200 may be the first session management network element in the foregoing embodiments, or may be a component (for example, a chip) of the first session management network element. The apparatus 1200 may implement steps or procedures performed by the first session management network element in the foregoing method embodiments. The transceiver unit 1210 may be configured to perform an operation related to sending and receiving of the first session management network element in the foregoing method embodiments. The processing unit 1220 may be configured to perform an operation related to processing of the first session management network element in the foregoing method embodiments.

In a possible implementation, the transceiver unit 1210 is configured to obtain IP address information of a visited network, and the transceiver unit 1210 is configured to send the IP address information to an edge application server discovery network element, where the first session management network element and the edge application server discovery network element are network elements deployed in a home network. Optionally, the processing unit 1220 is configured to determine the IP address information of the visited network.

Optionally, that the transceiver unit 1210 is configured to obtain the IP address information of the visited network includes: The transceiver unit 1210 is configured to obtain the IP address information of the visited network based on indication information, where the indication information indicates that traffic routing is allowed in the visited network.

Optionally, that the transceiver unit 1210 is configured to send the IP address information to the edge application server discovery network element includes: The transceiver unit 1210 is configured to send the IP address information to the edge application server discovery network element based on the indication information, where the indication information indicates that traffic routing is allowed in the visited network.

For example, the indication information includes an identifier of a first service, and the indication information indicates that the first service is allowed to be traffic-routed in the visited network.

Optionally, that the transceiver unit 1210 is configured to obtain the IP address information of the visited network includes: The transceiver unit 1210 is configured to receive the IP address information from a second session management network element, where the second session management network element is a network element deployed in the visited network.

Optionally, the transceiver unit 1210 is further configured to send first request information to the second session management network element, where the first request information is used to request the IP address information.

Optionally, the transceiver unit 1210 is further configured to send second request information to a network repository network element, where the second request information includes an identifier of the visited network, the second request information is used to request the IP address information, and the network repository network element is a network element deployed in the home network. That the transceiver unit 1210 is configured to obtain the IP address information of the visited network includes: The transceiver unit 1210 is configured to receive the IP address information of the visited network from the network repository network element.

Optionally, the first session management network element locally configures the indication information, or the transceiver unit 1210 is further configured to receive the indication information.

For example, the indication information includes first indication information and/or second indication information, the first indication information is locally configured by the first session management network element, and the second indication information is received by the first session management network element.

For example, the IP address information is information used to determine an extension mechanisms for domain name system DNS client subnet option; or the IP address information is an extension mechanisms for domain name system client subnet option or a local DNS server address.

In a second design, the apparatus 1200 may be the second session management network element in the foregoing embodiments, or may be a component (for example, a chip) of the second session management network element. The apparatus 1200 may implement steps or procedures performed by the second session management network element in the foregoing method embodiments. The transceiver unit 1210 may be configured to perform an operation related to sending and receiving of the second session management network element in the foregoing method embodiments. The processing unit 1220 may be configured to perform an operation related to processing of the second session management network element in the foregoing method embodiments.

In a first possible implementation, the transceiver unit 1210 is configured to obtain IP address information of a visited network, and the transceiver unit 1210 is configured to send the IP address information to a first session management network element, where the second session management network element is a network element deployed in the visited network, and the first session management network element is a network element deployed in a home network.

Optionally, that the transceiver unit 1210 is configured to obtain the IP address information of the visited network includes: The transceiver unit 1210 is configured to obtain the IP address information of the visited network based on indication information, where the indication information indicates that traffic routing is allowed in the visited network.

Optionally, that the transceiver unit 1210 is configured to send the IP address information to the first session management network element includes: The transceiver unit 1210 is configured to send the IP address information to the first session management network element based on the indication information, where the indication information indicates that traffic routing is allowed in the visited network.

For example, the indication information includes an identifier of a first service, and the indication information indicates that the first service is allowed to be traffic-routed in the visited network.

Optionally, the transceiver unit 1210 is further configured to receive first request information from the first session management network element, where the first request information is used to request the IP address information. That the transceiver unit 1210 is configured to send the IP address information to the first session management network element includes: The transceiver unit 1210 is configured to send the IP address information to the first session management network element in response to the first request information.

Optionally, the second session management network element locally configures the indication information, or the transceiver unit 1210 is configured to receive the indication information.

For example, the IP address information is information used to determine an extension mechanisms for domain name system DNS client subnet option; or the IP address information is an extension mechanisms for domain name system client subnet option or a local DNS server address.

In a second possible implementation, the transceiver unit 1210 is configured to obtain indication information, where the indication information indicates that traffic routing is allowed in a visited network; and the transceiver unit 1210 is configured to send IP address information of the visited network to a user plane network element based on the indication information, where the second session management network element and the user plane network element are network elements deployed in the visited network.

Optionally; that the transceiver unit 1210 is configured to obtain the indication information includes: The second session management network element locally configures the indication information, or the transceiver unit 1210 is configured to receive the indication information.

For example, the indication information includes an identifier of a second service, and the indication information indicates that the second service is allowed to be traffic-routed in the visited network.

For example, the indication information includes first indication information and/or second indication information, the first indication information is locally configured by the second session management network element, and the second indication information is received by the second session management network element.

For example, the IP address information is information used to determine an extension mechanisms for domain name system DNS client subnet option; or the IP address information is an extension mechanisms for domain name system client subnet option or a local DNS server address.

It should be understood that a process in which the units perform the foregoing corresponding steps is described in detail in the foregoing method embodiments. For brevity, details are not described herein.

It should be further understood that the apparatus 1200 herein is presented in a form of a functional unit. The term "unit" herein may refer to an application-specific integrated circuit (application-specific integrated circuit, ASIC), an electronic circuit, a processor (for example, a shared processor, a dedicated processor, or a group processor) configured to execute one or more software or firmware programs, a memory, a merged logic circuit, and/or another appropriate component that supports the described function. In an optional example, a person skilled in the art may understand that the apparatus 1200 may be the user plane network element in the foregoing embodiments, and may be configured to perform procedures and/or steps corresponding to the user plane network element in the foregoing method embodiments; or the apparatus 1200 may be the session management network element (for example, the first session management network element; in another example, the second session management network element) in the foregoing embodiments, and may be configured to perform procedures and/or steps corresponding to the session management network element in the foregoing method embodiments. To avoid repetition, details are not described herein again.

The apparatus 1200 in the foregoing solutions has a function of implementing corresponding steps performed by the network element (for example, the user plane network element or the session management network element (for example, the first session management network element; in another example, the second session management network element)) in the foregoing methods. The function may be implemented by hardware, or may be implemented by hardware executing corresponding software. The hardware or the software includes one or more modules corresponding to the foregoing function. For example, the transceiver unit may be replaced by a transceiver (for example, a sending unit in the transceiver unit may be replaced by a transmitter, and a receiving unit in the transceiver unit may be replaced by a receiver). Another unit, such as the processing unit, may be replaced by a processor to separately perform sending and receiving operations and a related processing operation in each method embodiment.

In addition, the transceiver unit 1210 may alternatively be a transceiver circuit (for example, may include a receiving circuit and a sending circuit), and the processing unit may be a processing circuit.

It should be noted that the apparatus in FIG. 12 may be the network element or the device in the foregoing embodiments, or may be a chip or a chip system, for example, a system on chip (SoC). The transceiver unit may be an input/output circuit or a communication interface. The processing unit is a processor, a microprocessor, or an integrated circuit integrated on the chip. This is not limited in this application.

Figure 13:
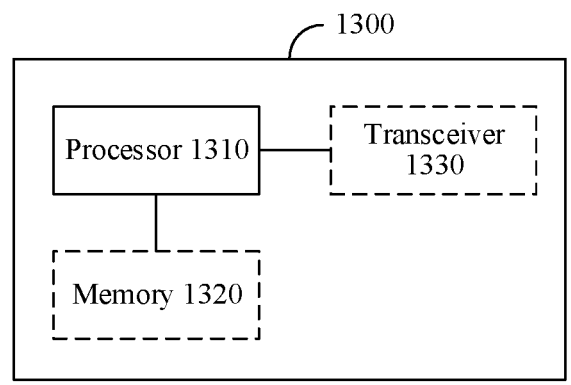
FIG. 13 is a schematic block diagram of another communication apparatus 1300 according to an embodiment of this application.

As shown in FIG. 13, an embodiment of this application provides another communication apparatus 1300. The apparatus 1300 includes a processor 1310. The processor 1310 is configured to execute a computer program or instructions stored in a memory 1320, or read data/signaling stored in the memory 1320, to perform the method in the foregoing method embodiments. Optionally, there are one or more processors 1310.

Optionally, as shown in FIG. 13, the apparatus 1300 further includes the memory 1320, and the memory 1320 is configured to store the computer program or the instructions and/or the data. The memory 1320 may be integrated with the processor 1310, or may be disposed separately. Optionally, there are one or more memories 1320.

Optionally, as shown in FIG. 13, the apparatus 1300 further includes a transceiver 1330. The transceiver 1330 is configured to receive and/or send a signal. For example, the processor 1310 is configured to control the transceiver 1330 to receive and/or send the signal.

In a solution, the apparatus 1300 is configured to implement an operation performed by the network element in the foregoing method embodiments.

For example, the processor 1310 is configured to execute the computer program or the instructions stored in the memory 1320, to implement a related operation of the user plane network element in the foregoing method embodiments, for example, the method performed by the user plane network element in the embodiment shown in FIG. 4, or the method performed by the V-UPF in any one of the embodiments shown in FIG. 5 to FIG. 11.

For another example, the processor 1310 is configured to execute the computer program or the instructions stored in the memory 1320, to implement a related operation of the first session management network element in the foregoing method embodiments, for example, the method performed by the first session management network element in the embodiment shown in FIG. 3, or the method performed by the H-SMF in any one of the embodiments shown in FIG. 5 to FIG. 11.

For another example, the processor 1310 is configured to execute the computer program or the instructions stored in the memory 1320, to implement a related operation of the second session management network element in the foregoing method embodiments, for example, the method performed by the second session management network element in the embodiment shown in FIG. 3 or FIG. 4, or the method performed by the V-SMF in any one of the embodiments shown in FIG. 5 to FIG. 11.

It should be understood that the processor in embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It should be further understood that the memory mentioned in embodiments of this application may be a volatile memory and/or a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM). For example, the RAM may be used as an external cache. By way of example, and not limitation, the RAM includes the following plurality of forms: a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is the general-purpose processor, the DSP, the ASIC, the FPGA or the another programmable logic device, the discrete gate or the transistor logic device, or the discrete hardware component, the memory (storage module) may be integrated into the processor.

It should further be noted that the memory described in this specification is intended to include but is not limited to these memories and any memory of another appropriate type.

An embodiment of this application further provides a computer-readable storage medium. The computer-readable storage medium stores computer instructions used to implement the method performed by the network element in the foregoing method embodiments.

For example, when a computer program is executed by a computer, the computer is enabled to implement the method performed by the user plane network element in the foregoing method embodiments.

For another example, when a computer program is executed by a computer, the computer is enabled to implement the method performed by the session management network element (for example, the first session management network element; in another example, the second session management network element) in the foregoing method embodiments.

An embodiment of this application further provides a computer program product, including instructions. When the instructions are executed by a computer, the method performed by the network element in the foregoing method embodiments is implemented.

An embodiment of this application further provides a communication system, including one or more of the foregoing user plane network element, first session management network element, second session management network element, and edge application server discovery network element.

For explanations and beneficial effects of related content of any one of the apparatuses provided above, refer to a corresponding method embodiment provided above. Details are not described herein again.

In the several embodiments provided in this application, it should be understood that the disclosed apparatuses and methods may be implemented in other manners. For example, the described apparatus embodiments are merely examples. For example, division into the units is merely logical function division and there may be other division in actual implementation. For example, a plurality of units or components may be combined or integrated into another system, or some features may be ignored or not performed. In addition, the displayed or discussed mutual couplings, direct couplings, or communication connections may be implemented through some interfaces. Indirect couplings or communication connections between the apparatuses or units may be implemented in an electrical form, a mechanical form, or another form.

A part or all of the foregoing embodiments may be implemented by using software, hardware, firmware, or any combination thereof. When the software is used to implement the embodiments, the part or all of the embodiments may be implemented in a form of a computer program product. The computer program product includes one or more computer instructions. When the computer program instructions are loaded and executed on a computer, a part or all of procedures or functions according to embodiments of this application are generated. The computer may be a general-purpose computer, a dedicated computer, a computer network, or another programmable apparatus. For example, the computer may be a personal computer, a server, or a network device. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. For example, the foregoing usable medium includes, but is not limited to any medium that can store program code, for example, a USB flash drive, a removable hard disk, a read-only memory (ROM), a random access memory (RAM), a magnetic disk, or an optical disc.

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
receiving, by a second session management network element in a visited network, from a first session management network element in a home network, indication information, wherein the indication information indicates that traffic routing is allowed in the visited network; and
sending, by the second session management network element and based on the indication information, internet protocol (IP) address information of the visited network to a user plane network element in the visited network, wherein the IP address information is information used to determine an extension mechanisms for domain name system client subnet (ECS) option, or the IP address information is a local domain name system (DNS) server address.

2. The method according to claim 1, wherein the indication information is carried in a Nsmf_PDUSession_Create Response massage.

3. The method according to claim 1, wherein the indication information comprises an identifier of a service, and the indication information indicates that the service is allowed to be traffic-routed in the visited network.

4. The method according to claim 3, wherein the identifier of a service is a fully qualified domain name or an IP address.

5. The method according to claim 1, wherein the user plane network element is an edge application server discovery network element.

6. The method according to claim 1, wherein the method is applied to a home routed scenario.

7. The method according to claim 1, further comprising:
receiving, by the user plane network element, the IP address information.

8. The method according to claim 7, wherein the method further comprises:
receiving, by the user plane network element, a DNS query message; and
adding, by the user plane network element, the ECS option to the DNS query message, wherein the ECS option is determined based on the IP address information.

9. The method according to claim 7, wherein the method further comprises:
receiving, by the user plane network element, a DNS query message; and
forwarding, by the user plane network element, the DNS query message to the local DNS server address, wherein the local DNS server address is determined based on the IP address information.

10. The method according to claim 1, wherein the method further comprises:
sending, by the first session management network element, the indication information to the second session management network element.

11. The method according to claim 10, wherein the method further comprises:
sending, by a policy control function network element in the home network, the indication information to the first session management network element; and
receiving, by the first session management network element, the indication information from the policy control function network element.

12. An apparatus in a visited network, comprising:
at least one processor; and
at least one memory coupled to the at least one processor and storing programming instructions that, when executed by the at least one processor, cause the apparatus to:
receive, from a first session management network element in a home network, indication information, wherein the indication information indicates that traffic routing is allowed in the visited network; and
send, based on the indication information, internet protocol (IP) address information of the visited network to a user plane network element in the visited network, wherein the IP address information is information used to determine an extension mechanisms for domain name system client subnet (ECS) option, or the IP address information is a local domain name system (DNS) server address.

13. The apparatus according to claim 12, wherein the indication information comprises an identifier of a service, and the indication information indicates that the service is allowed to be traffic-routed in the visited network.

14. The apparatus according to claim 12, wherein the apparatus is applied in a home routed scenario.

15. A communication system, comprising at least one processor to implement a second session management network element and a user plane network element in a visited network, wherein
the second session management network element is configured to:
receive, from a first session management network element in a home network, indication information, wherein the indication information indicates that traffic routing is allowed in the visited network; and
send, based on the indication information, internet protocol (IP) address information of the visited network to the user plane network element, wherein the IP address information is information used to determine an extension mechanisms for domain name system client subnet (ECS) option, or the IP address information is a local domain name system (DNS) server address; and
the user plane network element is configured to receive the IP address information.

16. The communication system according to claim 15, wherein the indication information comprises an identifier of a service, and the indication information indicates that the service is allowed to be traffic-routed in the visited network.

17. The communication system according to claim 15, wherein the user plane network element is further configured to:
receive a DNS query message; and
add the ECS option to the DNS query message, wherein the ECS option is determined based on the IP address information.

18. The communication system according to claim 15, wherein the user plane network element is further configured to:
receive a DNS query message; and
forward the DNS query message to the local DNS server address, wherein the local DNS server address is determined based on the IP address information.

19. The communication system according to claim 15, further comprising:
the first session management network element configured to send the indication information to the second session management network element.

20. The communication system according to claim 19, wherein the system further comprises: a policy control function network element configured to send the indication information to the first session management network element, and
wherein the first session management network element is further configured to receive the indication information from the policy control function network element.

* * * * *